(12) United States Patent
Gouneili

(10) Patent No.: US 11,526,906 B2
(45) Date of Patent: Dec. 13, 2022

(54) SYSTEM AND METHOD FOR SECURE CONTENT STREAMING, GOVERNANCE, FRAUD PREVENTION, AND THE EMBEDDING ARTIFICIAL INTELLIGENCE INTO CONTENT

(71) Applicant: Razmun Gouneili, Tiburon, CA (US)

(72) Inventor: Razmun Gouneili, Tiburon, CA (US)

( * ) Notice: Subject to any disclaimer, the term of this patent is extended or adjusted under 35 U.S.C. 154(b) by 0 days.

(21) Appl. No.: 17/228,408

(22) Filed: Apr. 12, 2021

(65) Prior Publication Data

US 2021/0233108 A1 Jul. 29, 2021

Related U.S. Application Data

(63) Continuation-in-part of application No. 16/996,679, filed on Aug. 18, 2020, now Pat. No. 10,979,745.

(Continued)

(51) Int. Cl.

| | |
|---|---|
| *H04N 21/2347* | (2011.01) |
| *G06Q 30/02* | (2012.01) |
| *H04L 9/00* | (2022.01) |
| *H04L 9/40* | (2022.01) |
| *G06F 21/44* | (2013.01) |
| *G06F 21/45* | (2013.01) |
| *G06Q 20/12* | (2012.01) |
| *G06N 5/04* | (2006.01) |
| *G06F 16/2458* | (2019.01) |

(Continued)

(52) U.S. Cl.
CPC ..... *G06Q 30/0248* (2013.01); *G06F 16/2465* (2019.01); *G06F 21/44* (2013.01); *G06F 21/45* (2013.01); *G06N 5/04* (2013.01); *G06Q 20/1235* (2013.01); *G06Q 30/0201* (2013.01); *G06V 20/10* (2022.01); *G10L 15/08* (2013.01); *G10L 15/22* (2013.01); *H04L 9/006* (2013.01); *H04L 63/0442* (2013.01); *G10L 2015/088* (2013.01); *H04N 21/2347* (2013.01)

(58) Field of Classification Search
CPC ................................................. H04N 21/2347
See application file for complete search history.

(56) References Cited

U.S. PATENT DOCUMENTS

| | | | | |
|---|---|---|---|---|
| 2002/0059144 A1* | 5/2002 | Meffert | ............. | H04N 21/8113 380/30 |
| 2016/0042157 A1* | 2/2016 | Drope | ............. | H04N 21/41407 713/165 |
| 2020/0275146 A1* | 8/2020 | Moroney | ......... | H04N 21/64322 |

* cited by examiner

*Primary Examiner* — Michael H Hong
(74) *Attorney, Agent, or Firm* — Steven A. Nielsen; www.NielsenPatents.com

(57) ABSTRACT

An automated system configured for streamed contents, to be self-aware in preventing fraudulent tactics, during real-time and offline usages, while communicating with its owner for accurate decision making, comprising: a content player module, and a content streaming service module; configured using a codec module to embed logic, encryptions, heuristics data, associated meta data, and management data into the content format; configured to use symmetric encryption keys, public keys, biometrics, and payload data; configured to authenticate the user and content owner; configured to request, receive, send, stream content, and analytics through a secure communication; configured to provide secure virtual communications between users and content owners; configured to use a call-home data, to enable the content and content owner to communicate and update one another securely; Configured to provide real-time, and offline, fraud prevention heuristics using artificial intelligence.

20 Claims, 10 Drawing Sheets

Related U.S. Application Data

(60) Provisional application No. 62/888,513, filed on Aug. 18, 2019.

(51) Int. Cl.
  *G10L 15/22* (2006.01)
  *G10L 15/08* (2006.01)
  *G06V 20/10* (2022.01)

SYSTEM AND METHOD FOR SECURE CONTENT STREAMING, GOVERNANCE, FRAUD PREVENTION, AND THE EMBEDDING ARTIFICIAL INTELLIGENCE INTO CONTENT

CROSS-REFERENCE TO RELATED APPLICATIONS

This patent application is a CIP or Continuation in Part of U.S. application Ser. No. 16/996,679 filed on Aug. 18, 2020 which claims priority benefit of U.S. Provisional Patent Application No. 62/888,513 entitled "A METHOD AND APPARATUS FOR SECURE AUDIO AND VIDEO STREAMING, CONTENT GOVERNANCE AND STREAMING FRAUD PREVENTION", filed on Aug. 18, 2019. The entire contents of the above referenced patent applications are hereby incorporated by reference herein in its entirety.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a system and method for managing contents (a digital media, digital multimedia, digital document, digital file, computer file format, container format, format, computer algorithm, application, webpage, software, source code, code, meta data, virtual communications (a computer-mediated communication, etc.), and artificial intelligence (a suggestion, advice, decision, using a codec module to embed, encode, compress, decompress, decode the proper logic (a algorithm, computer vision algorithm, speech recognition algorithm, artificial intelligence, encryptions (a ultrasound, infrasound, heuristics data (a fraud detection module, fraud prevention module, fraud manager heuristics data, associated meta data, and management data (what the user can do, and can't do, or what the user device can do, and can't do, etc.) to a stream. More particularly, the system and method for secure content streaming, governance, fraud prevention, and embedding artificial intelligence into content.

BACKGROUND

Over the years, a variety of different approaches have been developed to detect and prevent the fraudulent use of content, virtual communications, artificial intelligence, and the manipulation of its data and transactions. Nowadays, to gain client confidence and prevent revenue loss, content owners and content distributors desire an accurate and trustworthy way of detecting possible fraud. Online services growing in popularity including social networking streaming and communication services, software services, adult entertainment platforms, mobile banking platforms, trading services platforms, and E & M—commerce—have increased the liabilities of identity and digital fraud. Existing systems that ask for user credentials such as user name, address, phone number, authentication systems, and e-mail address may not be sufficient to detect and determine a probable fraudulent tactic as much of this information is altered, manipulated, fraudulently obtained, or simply false.

Similarly, content owners and content distributors have very little visibility into who is using the content, virtually communicating, or using artificial intelligent, and where the streamed content is being used within the internet from digital streaming platforms (DSP's), and non-digital streaming platforms (DP's). Tracking, accounting, and deleting of content is weak and in some instances, not possible. Content owners, digital platforms and content distributors, are often defrauded from being correctly compensated and receive little to no insight into their content usage meta data. In most instances, the tracking and controlling of contents, virtual communications, and artificial intelligent usages—if it exists—is reactive as opposed to being proactive. Furthermore, there are several shortcomings in the architecture of the most current digital content streaming infrastructures, non-streaming infrastructures, and existing formats, and codecs. Content and digital platforms are still subjected to fraud by being susceptible to illegal piracy, copyright infringements, and a spectrum of illegal manipulative tactics such as: ripping, Of downloading, and leaking of the original contents, virtual communications, and artificial intelligent usages for other usage purposes, offline downloads and cache misusages to prevent further subscription transactions, copy and pasting content, or texts from the internet to a user's device, virtual and artificial machine generated tactics, such as fake streaming, click-botting, or using a third-party device to record content, and virtual communications, device screen shotting, device screen and sound recordings, using a third-party software that blocks ads, and watermarks from freemium model revenues and account password sharing.

In the light of the aforementioned discussion, there exists a need for a system that allows significant reduction in possibility of fraud and the possibility for content, virtual communications, and artificial intelligence to proactively communicate with its owner or distributor around its attempted fraudulent misusages and meta data. Existing systems do not leverage the power of artificial intelligence to embed content in such a way that allows for it to be self-aware to provide precise, and up-to-the-minute tracking, management, governance, and accounting. This disclosure and its methodology for this system below provides existing centralized infrastructures the benefits and possibilities of decentralized infrastructures, or to be integrated into a decentralized infrastructure and network as a disruptive streaming player.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards an automated system that prevents significant reduction of the possibility of a fraud, or a third-party fraud, online or offline, while providing precise and up-to-the-minute tracking, management, governance, and accounting of the streams of one or more contents, virtual communications, and artificial intelligent suggestions or advice.

Another objective of the present disclosure is directed towards an automated system that uses a codec module to embed, encode, compress, decompress, decode the proper logic, encryptions, heuristics data, associated meta data and management data to a stream; and prevent fraudulent tactics of the requested contents, virtual communications, and artificial intelligent suggestions or advice, to a user, while collecting various information from the user and other sources.

Another objective of the present disclosure is directed towards a system that provides secure and fast communications between the player (user) and streaming service (content owner).

Another objective of the present disclosure is directed towards an automated system that prevents in real-time or offline, illegal copying, manipulative tactics, and man-in-the-middle attacks, preventing reverse engineering, along with third-party devices from illegally recording, streaming, or sharing the contents, virtual communications, and artificial intelligent suggestions or advice.

Another objective of the present disclosure is directed towards an automated system that provides analytics, predictions, prescriptive analytics, suggestions, and advice related to creative and business decision makings, and accurate tracking, accounting, and managing the contents, virtual communications, and artificial intelligent suggestions or advice for content owner compensation.

Another objective of the present disclosure is directed towards a system that provides a universal portal for more actionable features.

Another objective of the present disclosure is directed towards a system that provides more alternatives for customer billing, transaction disbursements, investments, digital currency trades, non-fungible tokens and analytics.

Another objective of the present disclosure is directed towards a system that uses a highly secure public key infrastructure, or a biometric public key infrastructure for authentication.

Another objective of the present disclosure is directed towards a system that guarantees identification of the streaming service through highly secure public key infrastructure, or a biometric public key infrastructure.

Another objective of the present disclosure is directed towards a system that ensures the first computing device and the content streaming service module uses a private/public key, or biometric key for secure authentication.

Another objective of the present disclosure is directed towards a system that encrypts the communication between the first computing device and the content streaming service module by exchanging the symmetric encryption key for fast and highly secure communications.

Another objective of the present disclosure is directed towards an automated system that provides more configurations through the content streaming service module.

Another objective of the present disclosure is directed towards an automated system that provides accurate call-home data for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

Another objective of the present disclosure is directed towards an automated system that prevents to clone the call-home data by a virtual and artificial machine generated tactic, click-bot or a bot attack prevention module.

In an embodiment of the present disclosure, the system comprising a content player module configured to enable a first user to request one or more content, virtual communications with a content owner 104, and request artificial intelligent suggestions or advice, on a first computing device through at least one of: search including voice search one or more keywords, or request for artificial intelligent suggestions or advice, on the content player module; request continuous play or usage of the one more contents, virtual communications, and artificial intelligent suggestions or advice, from a pre-established station or service on the content player module.

In another embodiment of the present disclosure, the system further comprising a content streaming service module configured to establish a PKI (public key infrastructure), or establish a biometric-PKI authentication system, which employs biometric data that uses a public key, for secure communication between the content player module on the first computing device and a second computing device when a first user's login request received from the content player module to the content streaming service module, the content streaming service module configured to send one or more symmetric encryption keys to the content player module on the first computing device through the PKI, or the biometric-PKI for the secure communication between the first user and a second user, the content streaming service module configured to deliver the requested one or more contents—virtual communications by the content owner 104, and artificial intelligent suggestions or advice, using the codec module 319 to embed, and encode them, with the proper logic, encryptions, heuristics data, associated meta data, and management data, to the content player module through a payload data that includes streams of contents, virtual communications, artificial intelligent suggestions or advice—along with their embedded logic, encryptions, heuristics data, associated meta data, and management data—that then becomes decoded through the content player module 108, codec module 407*d*, when the content player module starts playing, using, or preventing fraudulent tactics of the one or more content, virtual communications, and artificial intelligent suggestions or advice, the content player module is configured to connect to the content streaming service module with call-home data for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

FIG. 1 depicts a schematic representation of the system for secure content streaming, governance, streaming fraud prevention, and embedding artificial intelligent into content in accordance with one or more exemplary embodiments.

Figure 1:
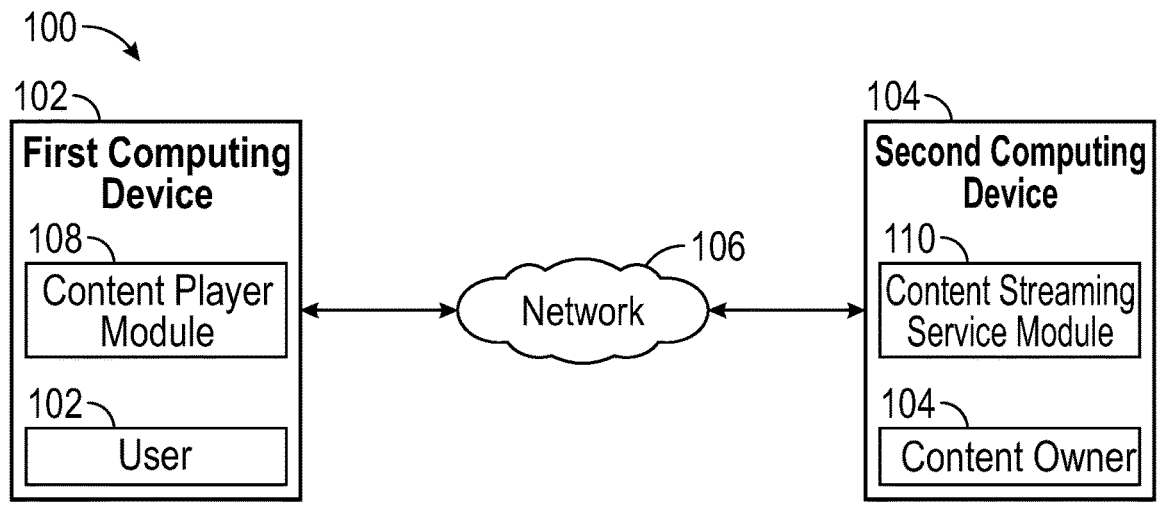
FIG. 1 is a block diagram representing a system in which aspects of the present disclosure can be implemented. Specifically.

Furthermore, the objects and advantages of this invention will become apparent from the following description and the accompanying annexed drawings.

REFERENCE NUMERALS IN THE DRAWINGS

Figure 2:
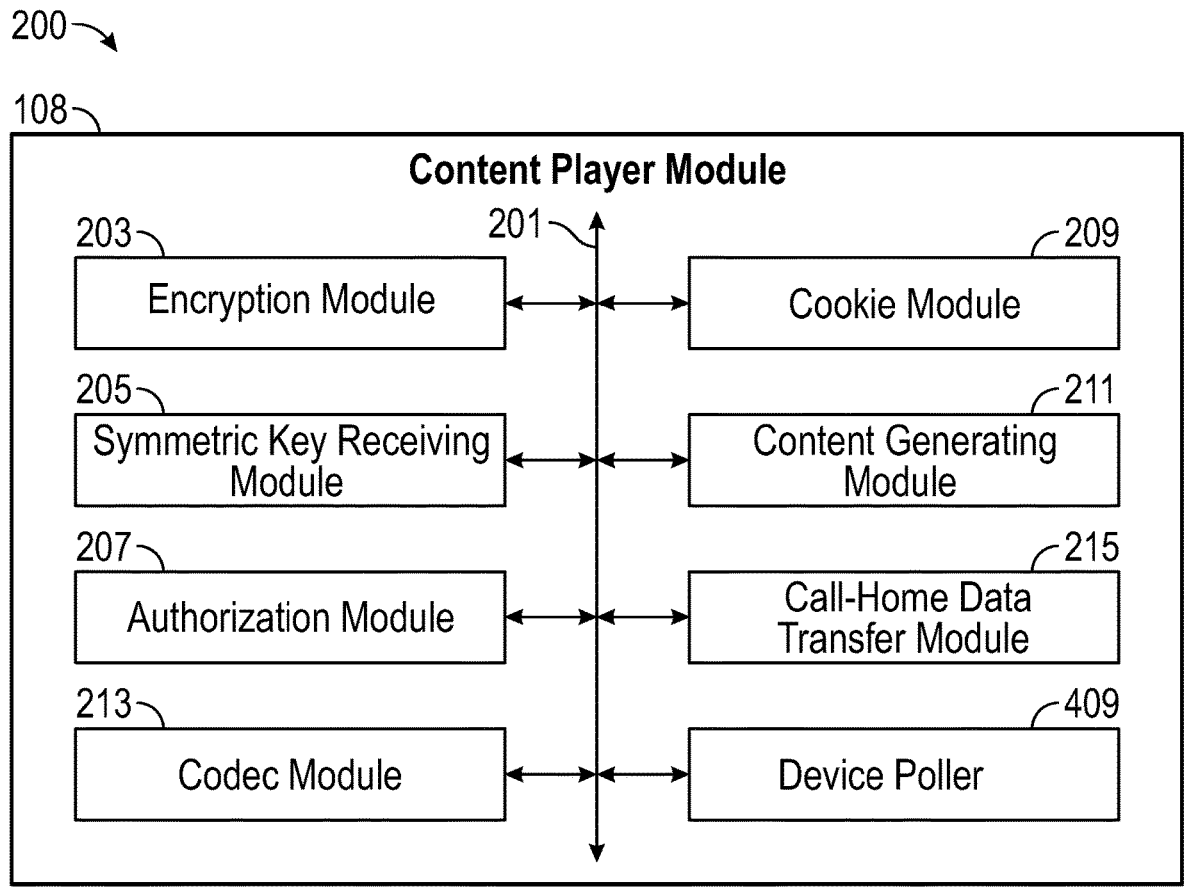
FIG. 2 is a block diagram depicting a schematic representation of the content player module 108 shown in FIG. 1, in accordance with one or more exemplary embodiments.
Figure 3:
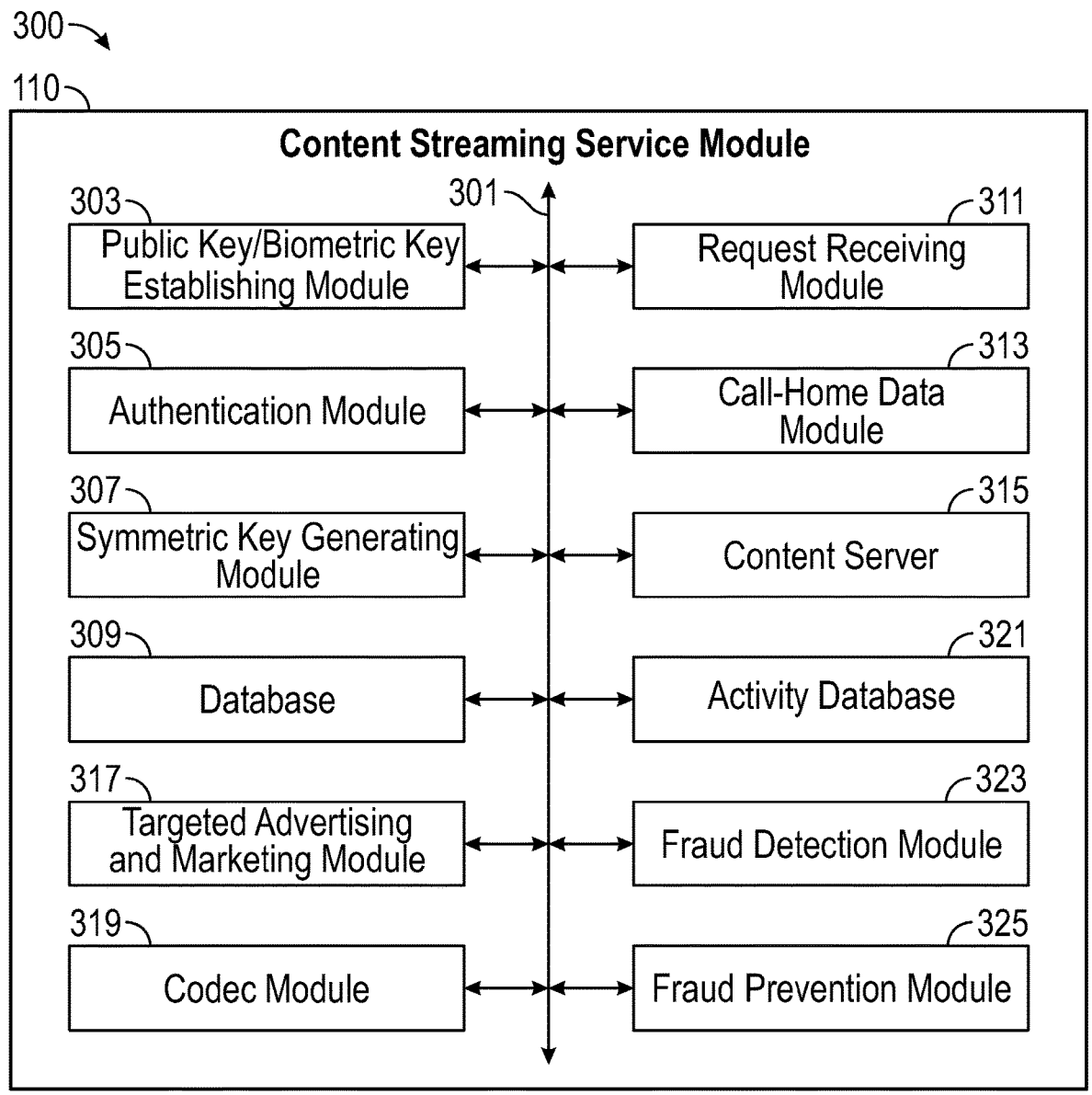
FIG. 3 is a block diagram depicting a schematic representation of the content streaming service module 110 shown in FIG. 1, in accordance with one or more exemplary embodiments.
Figure 4:
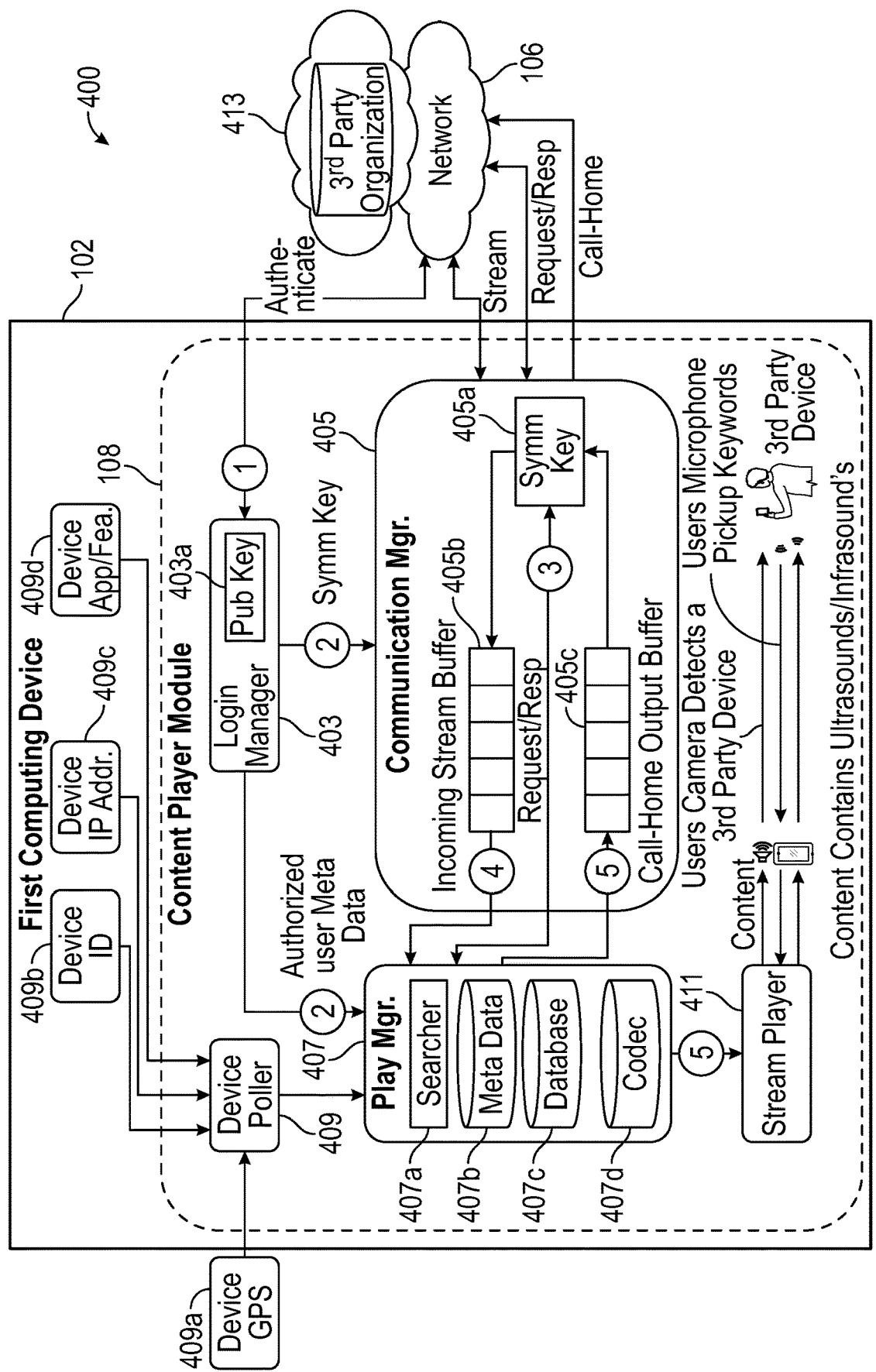
FIG. 4 is an example diagram depicting an architecture of the content player module 108 installed on the first computing device 102 shown in FIG. 1, in accordance with one or more exemplary embodiments.
Figure 5:
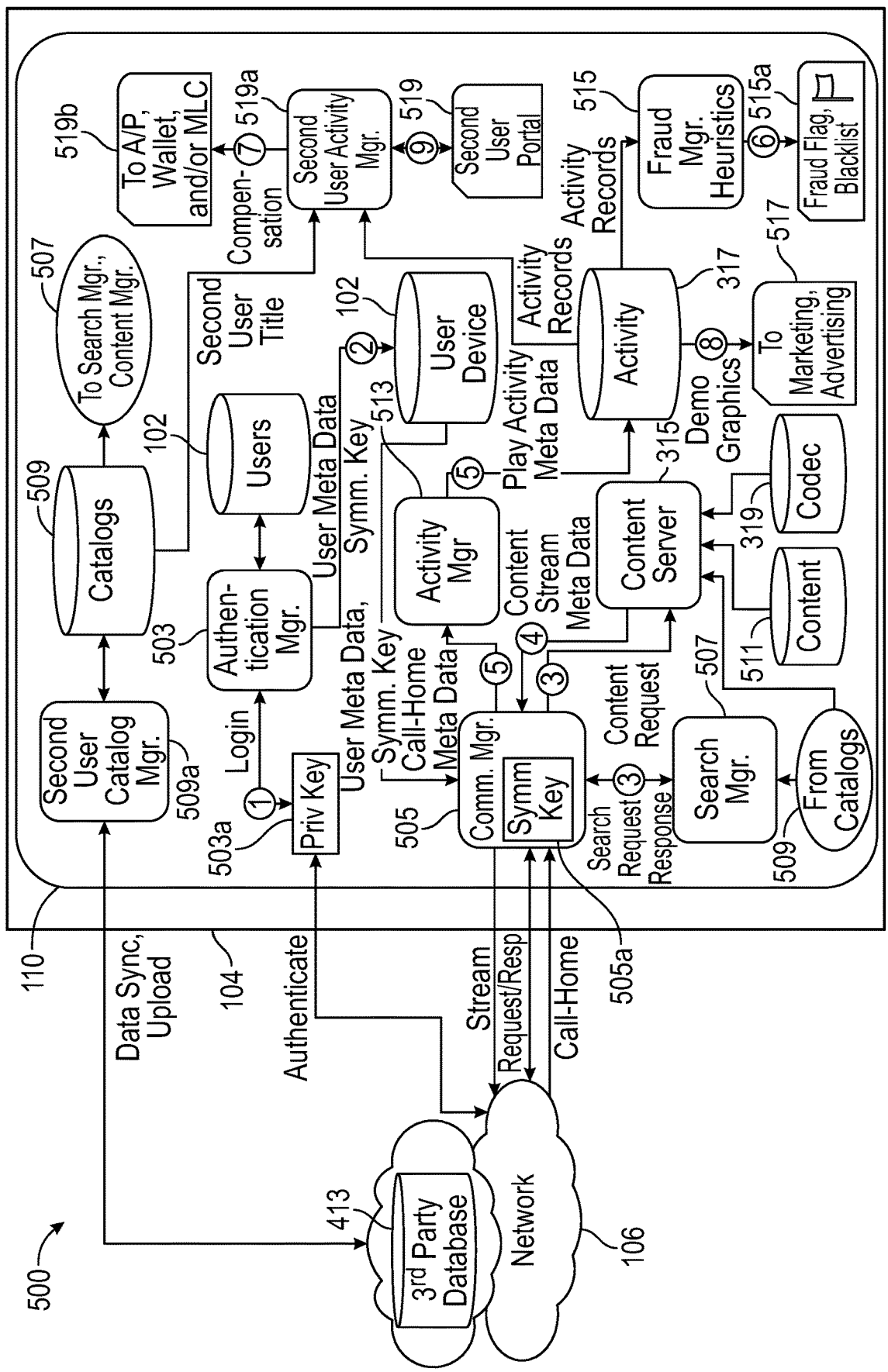
FIG. 5 is an example diagram depicting an architecture of the content streaming service module 110 installed on the second computing device 104 shown in FIG. 1, in accordance with one or more exemplary embodiments.
Figure 6:
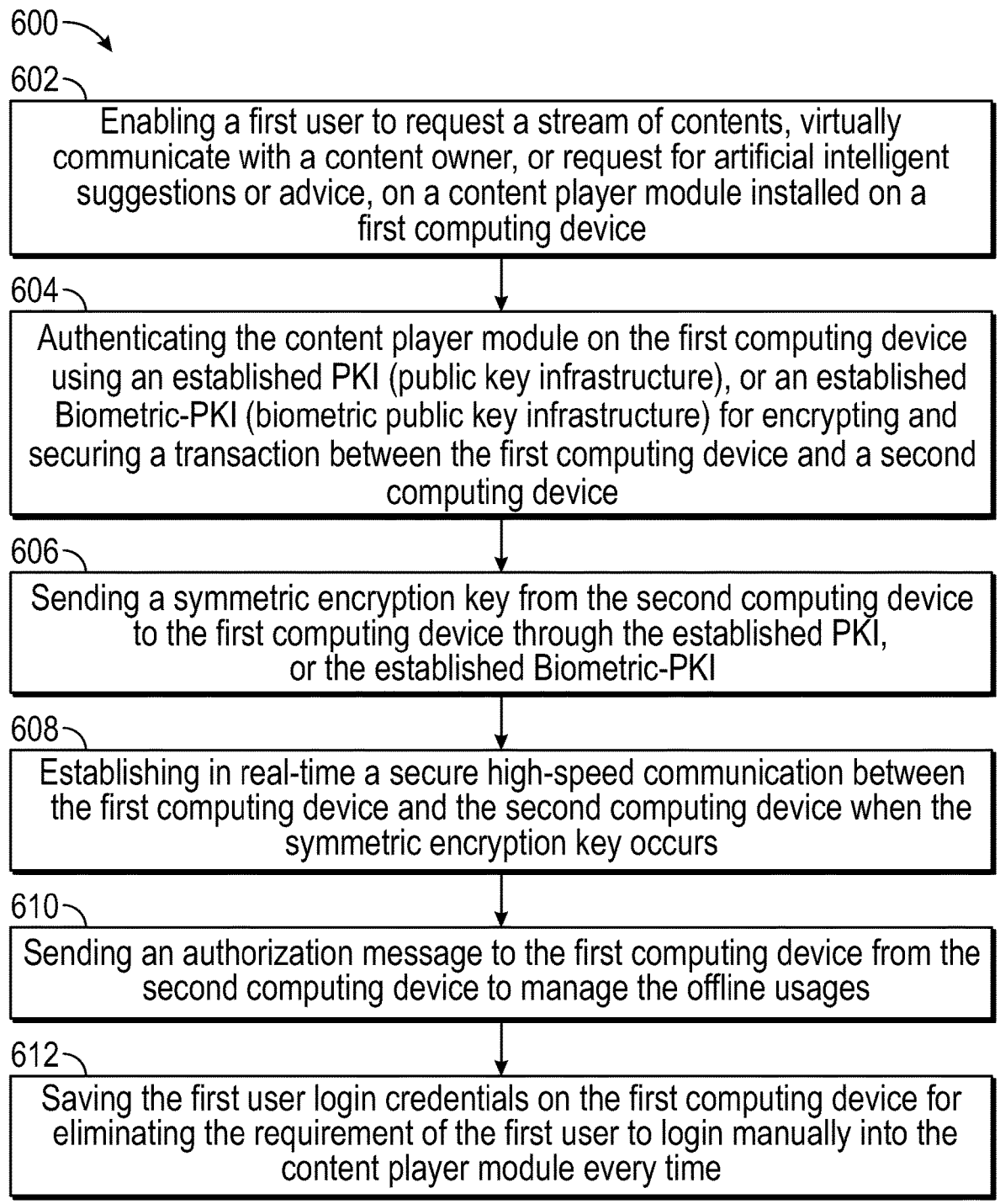
FIG. 6 is an example flow diagram depicting a method for saving the first user login credentials, in accordance with one or more exemplary embodiments.
Figure 7:
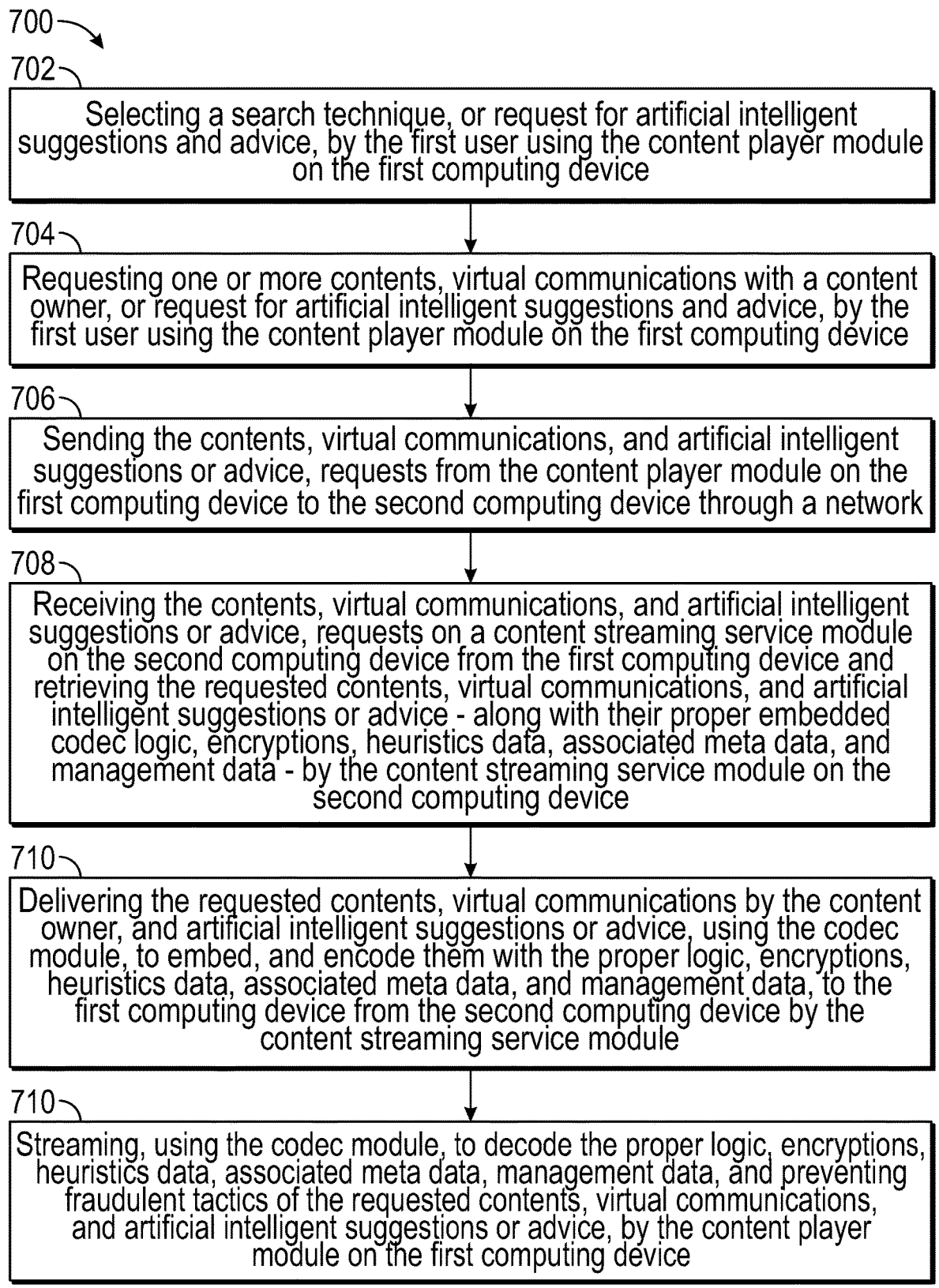
FIG. 7 is an example flow diagram depicting a method for streaming, using a codec module to decode the proper logic, encryptions, heuristics data, associated meta data, management data, and preventing fraudulent tactics, of the requested contents, virtual communications, and artificial intelligent suggestions or advice, by the content player module, in accordance with one or more exemplary embodiments.
Figure 8:
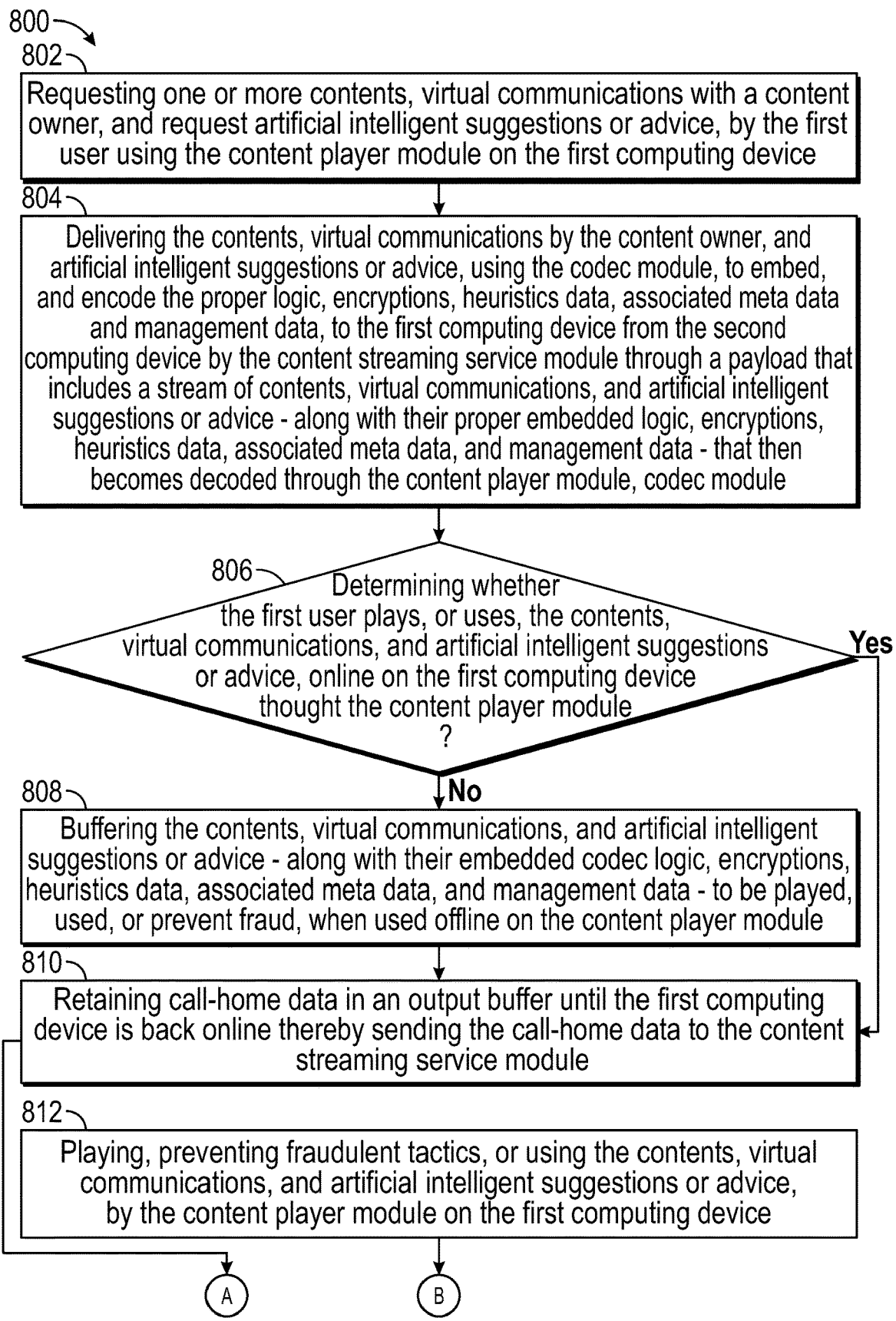
FIG. 8 is an example flow diagram depicting a method for securing and eliminating the usage of the content player module by third party modules, in accordance with one or more exemplary embodiments.
Figure 8:
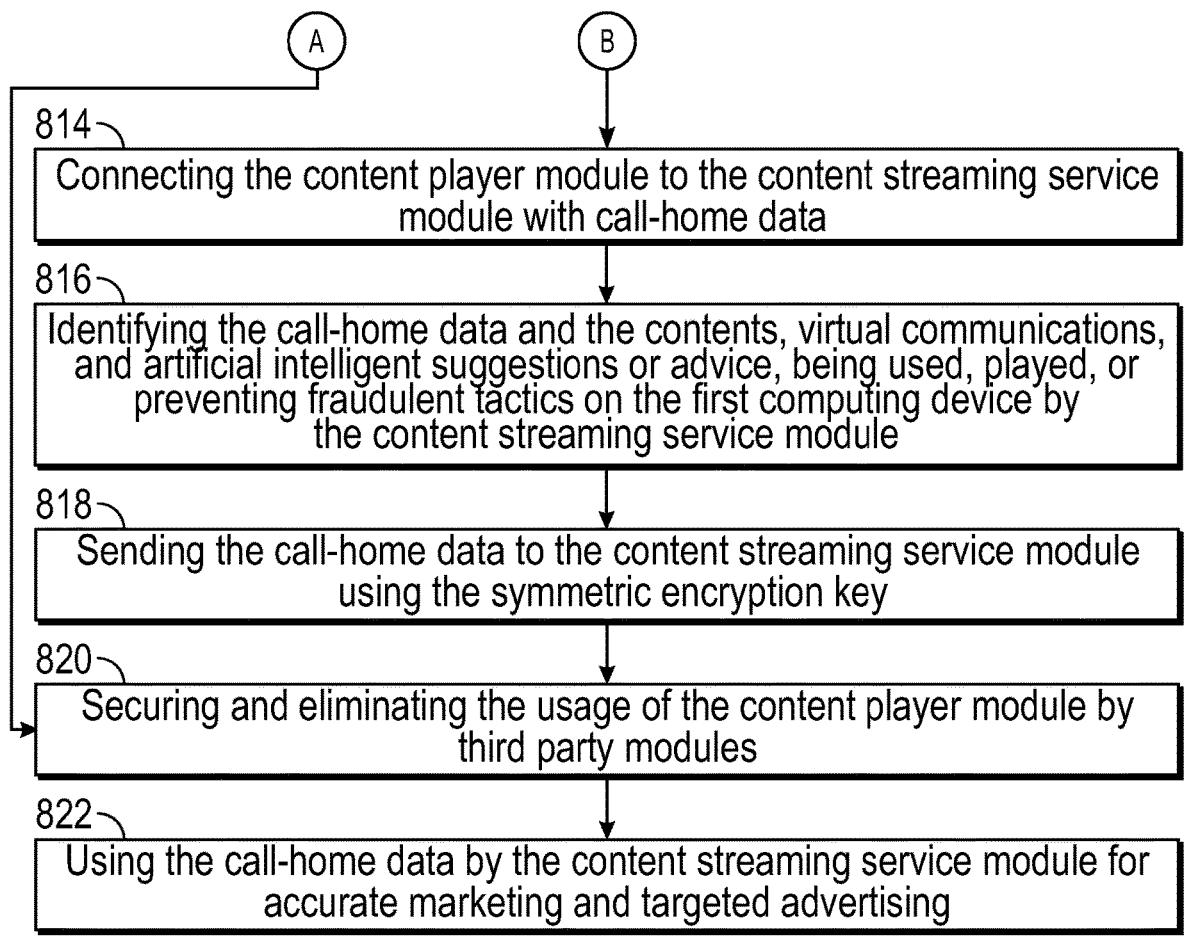

FIG. 1, 100 discloses a system configured for controlled streaming of content
102 First Computing Device of 100 system
104 Second Computing Device of 100 system
106 Network of 100 system
108 Content Player Module of 100 system
110 Content Streaming Service Module of 100 system
  FIG. 2, 200 discloses a 108 Content Player Module of 100 system 201 Bus
203 Encryption Module
205 Symmetric Key Receiving Module
207 Authorization Module
209 Cookie Module
211 Content Generating Module
213 Codec Module
215 Call-Home Information Transfer Module FIG. 3, 300 discloses 110 Content Streaming Service Module of 100 system
110 Content Service Module
301 Bus
303 Public Key Establishing Module
305 Authentication Module
307 Symmetric Key Generating Module
309 Database
311 Request Receiving Module
313 Call-Home Information Module
315 Content Server
317 Targeted Advertising and Marketing Module
319 Codec Module
321 Activity Database
323 Fraud Detection Module
325 Fraud Prevention Module
  FIG. 4, 400 discloses an example diagram 400 depicting architecture of the 108 content player module
403 a Login Manager
405 Communication Manager
407 Play Manager
409 Device Poller
411 Stream Player
403a established PKI, or Biometric-PKI of 403 Login Manager
413 3rd Party-Administered Database/3rd party-organization Database
405a Symmetric keys of 405 Communication Manager
405b Incoming Stream Buffer of 405 Communication Manager
405c Output Buffer 405c of 405 Communication Manager
407a Searcher of 407 Play Manager
407b Metadata of 407 Play Manager
407c Database of 407 Play Manager
407d Codec of 407 Play Manager
409a Device GPS of 409 Device Poller
409b Device ID of 409 Device Poller
409c Device IP address of 409 Device Poller
409d Device Applications/Features of 409 Device Poller
106 Network
  FIG. 5, 500 discloses an example diagram 400 depicting architecture of the 110 content streaming service module
503 Authentication Manager(Mgr.)
505 Communication Manager
507 Search Manager
509 Catalog Database
511 Content Database
315 Content Server
319 Codec Module
513 Activity Manager
515 Fraud Manager Heuristics
517 Marketing, Advertising Block
519 Second User Portal
503a PKI, or Biometric-PM of 503 Authentication Manager
505a Symmetrical Encryption Key of 505 Communication Manager
509a Second User Catalog Manager
515a Fraud Flag Blacklist of 515 Fraud Manager Heuristics
519a Second User Activity Manager of 519 Second User Portal
519b Accounts Payable, Wallets of 519 Second User Portal
  FIG. 6, 600 discloses a method for saving the first user login credentials
602 Enabling a first user to request a stream of contents, virtually communicate with a content owner (104), and request for artificial intelligent suggestions or advice, on a content player module installed on a first computing device 604 Authenticating the content player module on the first computing device using an established PKI (public key infrastructure), or an established Biometric-PKI (biometric public key infrastructure) for encrypting and securing a transaction between the first computing device and a second computing device 606 Sending a symmetric encryption key from the second computing device to the first computing device through the established PKI, or the established Biometric-PKI 608 Establishing in real-time a secure high-speed communication between the first computing device and the second computing device when the symmetric encryption key occurs 610 Sending an authorization message to the first computing device from the second computing device to manage the offline usages 612 Saving the first user login credentials on the first computing device for eliminating the requirement of the first user to login manually into the content player module each time FIG. 7 discloses a method for streaming, using a codec module to decode the proper logic, encryptions, heuristics data, associated meta data, management data, and preventing fraudulent tactics, of the requested contents, virtual communications, and artificial intelligent suggestions or advice by the content player module 702 Selecting a search technique, or request for artificial intelligent suggestions and advice, by the first user using the content player module on the first computing device 704 Requesting one or more contents, virtual communications with a content owner (104), or request for artificial intelligent suggestions and advice, by the first user using the content player module on the first computing device 706 Sending the contents, virtual communications, and artificial intelligent suggestions or advice, requests from the content player module on the first computing device to the second computing device through a network 708 Receiving the contents, virtual communications, and artificial intelligent suggestions or advice, requests on a content streaming service module on the second computing device from the first computing device and retrieving the requested contents, virtual communications, and artificial intelligent suggestions or advice, by the content streaming service module on the second computing device 710 Delivering the requested contents, virtual communications by the content owner (104), and artificial intelligent suggestions or advice, using the codec module 319 to embed, and encode them with the proper logic, encryptions, heuristics data, associated meta data, and management data to the first computing device from the second computing device by the content streaming service module 712 Streaming, using the codec module 407d, to decode the proper logic, encryptions, heuristics data, associated meta data, management data, and preventing fraudulent tactics of the requested contents, virtual communications, and artificial intelligent suggestions or advice, by the content player module on the first computing device FIG. 8 discloses a method for securing and eliminating the usage of the content player module by third party modules 802 Requesting one or more contents, virtual communications with a content owner (104), and request artificial intelligent suggestions or advice, by the first user using the content player module on the first computing device 804 Delivering the contents, virtual communications by the content owner (104), and artificial intelligent suggestions or advice, using the codec module 319 to embed, and encode them with the proper logic, encryptions, heuristics data, associated meta data, and management data, to the first computing device from the second computing device by the content streaming service module through a payload that includes a stream of contents, virtual communications, and artificial intelligent suggestions or advice—along with their proper embedded logic, encryptions, heuristics data, associated meta data, and management data—that then becomes decoded through the content player module 108, codec module 407d.

Figure 9:
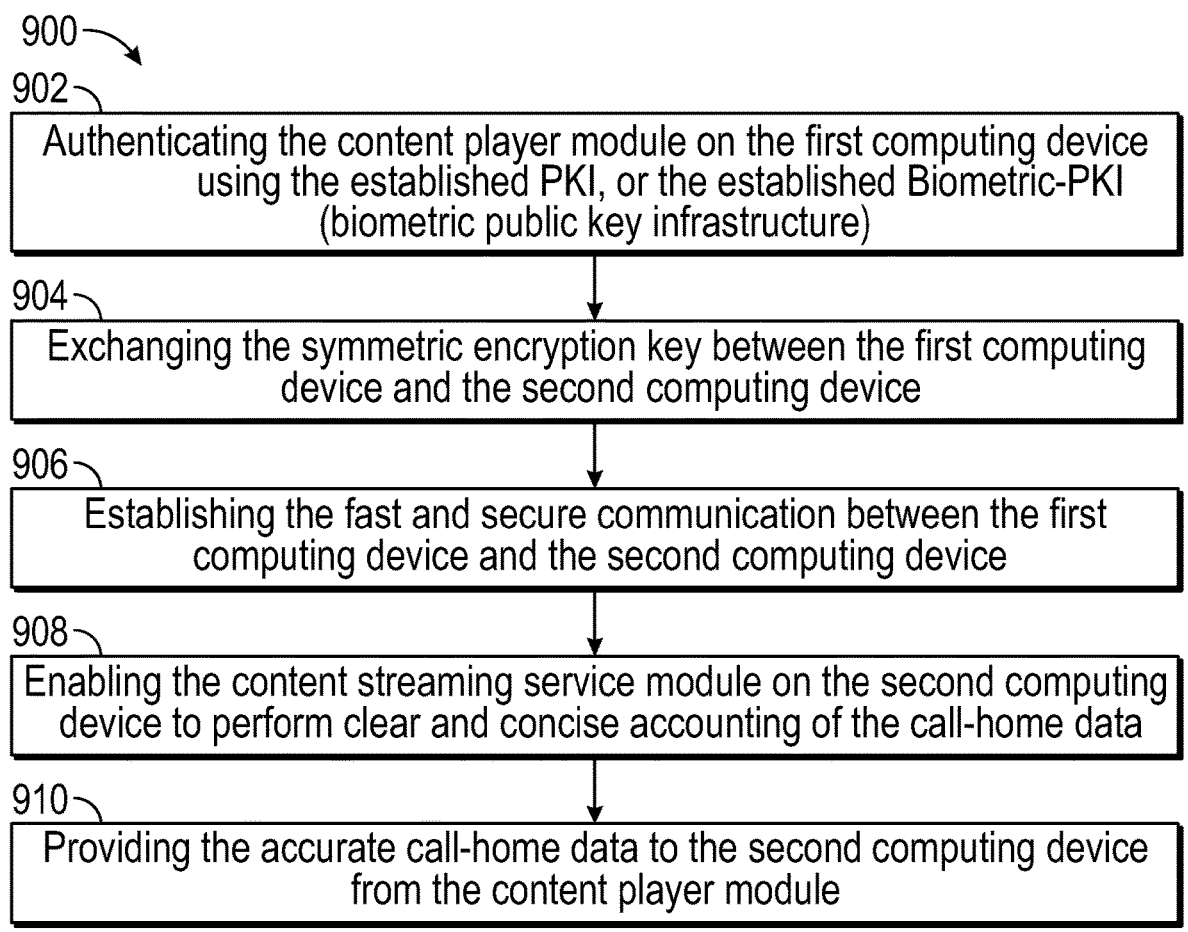
FIG. 9 is an example flow diagram depicting a method for providing the accurate call-home data to the second computing device from the content player module, in accordance with one or more exemplary embodiments.

806 Determining whether the first user plays, or uses the contents, virtual communications, and artificial intelligent suggestions or advice, online on the first computing device through the content player module 808 Buffering the contents, virtual communications, and artificial intelligent suggestions or advice—along with their embedded codec logic, encryptions, heuristics data, associated meta data, and management data—to be played, used, or prevent fraud, when used offline on the content player module 810 Retaining call-home data in an output buffer until the first computing device is back online thereby sending the call-home data to the content streaming service module 812 Playing, preventing fraudulent tactics, or using the contents, virtual communications, and artificial intelligent suggestions or advice, by the content player module on the first computing device 814 Connecting the content player module to the content streaming service module with call-home data 816 Identifying the call-home data and the contents, virtual communications, and artificial intelligent suggestions or advice, being used, played, or preventing fraudulent tactics on the first computing device by the content streaming service module 818 Sending the call-home data to the content streaming service module using the symmetric encryption key 820 Securing and eliminating the usage of the content player module by third party modules 822 Using the call-home data by the content streaming service FIG. 9 discloses a method for providing the accurate call-home data to the second computing device from the content player module 902 Authenticating the content player module on the first computing device using the established PKI (public key infrastructure), or the established Biometric-PKI (biometric public key infrastructure)

Figure 10:
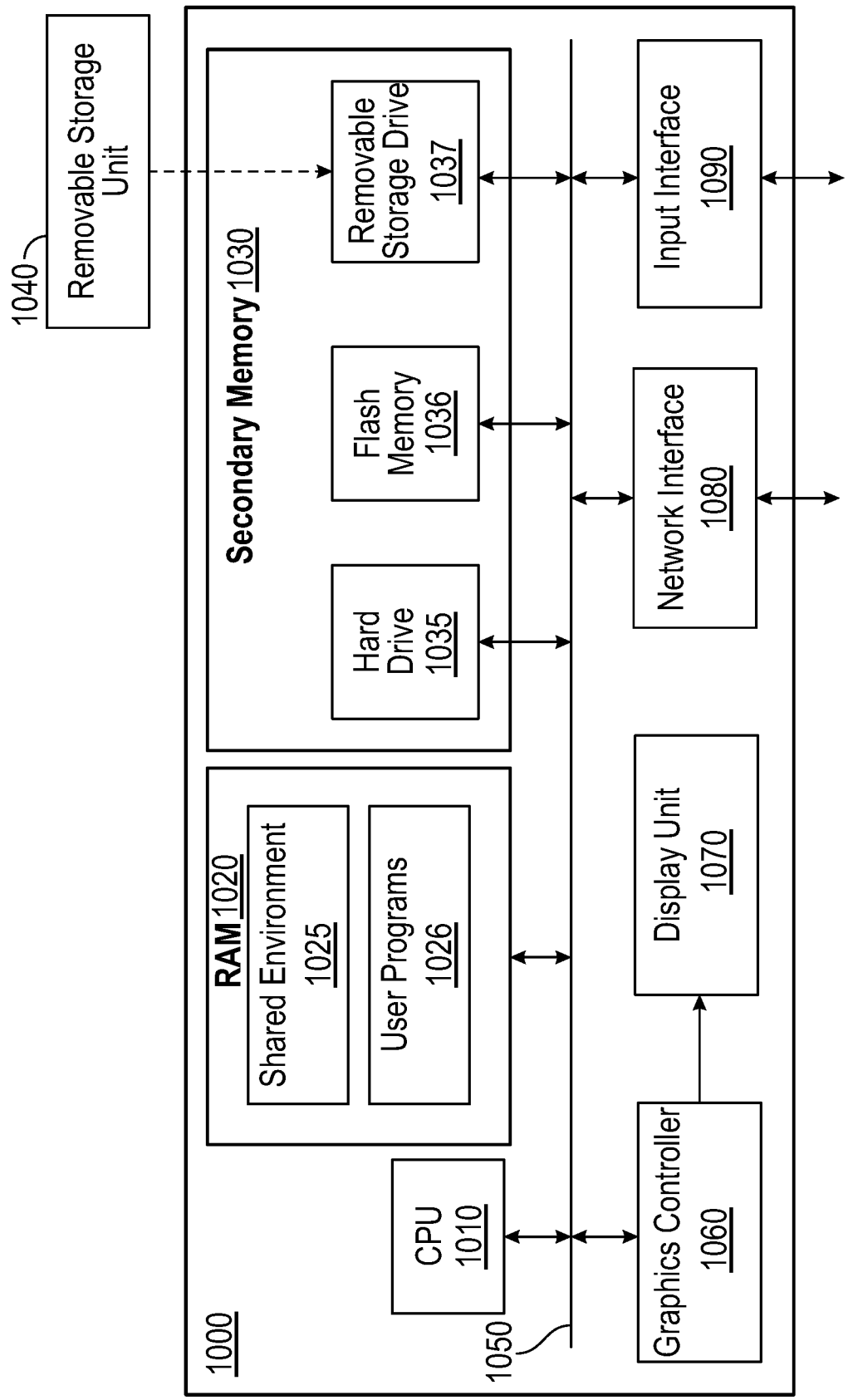
FIG. 10 is a block diagram illustrating the details of digital processing system in which various aspects of the present disclosure are operative by execution of appropriate software instructions.

904 Exchanging the symmetric encryption key between the first computing device and the second computing device 906 Establishing the fast and secure communication between the first computing device and the second computing device 908 Enabling the content streaming service module on the second computing device to perform clear and concise accounting of the call-home data 910 Providing the accurate call-home data to the second computing device from the content player module FIG. 10—digital processing system corresponds to the computing device 1010 CPU
1020 Random Access Memory (RAM)
1025 Shared Environment of RAM 1020
1026 User Programs of RAM 1020
1030 Secondary Memory
1035 Hard Drive of secondary Memory 1030
1036 Flash Memory of secondary Memory 1030

1037 Removable Storage Drive of secondary Memory 1030
1040 Removable Storage Unit
1050 Communication Path
1060 Graphics Controller
1070 Display Unit
1080 Network Interface
1090 An Input Interface

DETAILED DESCRIPTION OF EXAMPLE
EMBODIMENTS

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

Referring to FIG. 1, FIG. 1 is a block diagram 100 representing a system in which aspects of the present disclosure can be implemented. Specifically, FIG. 1 depicts a schematic representation of the system for secure content streaming, governance, fraud prevention, and embedding artificial intelligent into content in accordance with one or more exemplary embodiments. The system 100 includes a first computing device 102, and a second computing device 104 operatively coupled to each other through a network 106. The network 106 may include, but is not limited to, an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and the like without limiting the scope of the present disclosure. The system 100 is preferably realized as a computer-implemented system in that the first and second computing devices (102, 104) are configured as computer-based electronic devices.

Although the first and second computing devices 102, 104 are shown in FIG. 1, an embodiment of the system 100 may support any number of computing devices. The system 100 may support only one computing device (102 or 104). The computing devices 102, 104 may include, but are not limited to, a desktop computer, a personal mobile computing device such as a tablet computer, a laptop computer, or a notebook computer, a smartphone, a server, an augmented reality device, a virtual reality device, a digital media player, a piece of home entertainment equipment, backend servers hosting database and other software, and the like. Each computing device 102, 104 supported by the system 100 is realized as a computer-implemented or computer-based device having the hardware or firmware, software, and/or processing logic needed to carry out the intelligent messaging techniques and computer-implemented methodologies described in more detail herein. The first computing device 102 and/or the second computing device 104 may be configured to display features by a content player module 108, a content streaming service module 110. The features may be helpful to find out the content on the first computing device 102 and/or the second computing device 104. The first computing device 102 and/or the second computing device 104 may be operated by a first user and a second user. The first user may include, but not limited to, a user (102), a client, a player, a gamer, an engineer, a scientist, an individual, a stakeholder, an advertiser, a sponsor, an employee, an organization, and the like. The second user may include, but not limited to, a content owner (104), a content creator, a content performer, a content provider, a blogger, an author, a gamer, a coder, an engineer, a scientist, a practitioner, an expert, and the like.

The content player module 108, and the content streaming service module 110 which are accessed as a mobile application, web application, software that offers the functionality of mobile applications, and viewing/processing of interactive pages, for example, are implemented in the first and second computing devices 102, 104 as will be apparent to one skilled in the relevant arts by reading the disclosure provided herein. For example, the first computing device 102 includes the content player module 108 (for example, mobile application) downloaded from a cloud server (not shown). Whereas the second computing device 104 may be directly accessed the content streaming service module 110 (for example, web application). The content player module 108, and the content streaming service module 110 may be integrated into another established infrastructure, application, API, or SDK, and any suitable application downloaded from GOOGLE PLAY® (for Google Android devices), Apple Inc.'s APP STORE® (for Apple devices), or any other suitable database. In some embodiments, the content player module 108 and the content streaming service module 110 may be software, firmware, or hardware that is integrated into the first and second computing devices 102 and 104.

The content player module 108 may be the software that resides on the first computing device 102 and is responsible for using the codec module 407d, to decode, the proper logic, encryptions, heuristics data, associated meta data, management data, for using, playing, or preventing fraudulent tactics, of the requested contents, virtual communications, and artificial intelligent suggestions or advice from being used. The content streaming service module 110 is the entity that is responsible for streaming, and using the codec module 319 to embed, encode, the proper logic, encryptions, heuristics data, associated meta data, management data, and preventing fraudulent tactics of the requested contents, virtual communications, and artificial intelligent suggestions or advice, to the first user on the first computing device 102, that decodes them through the content player module 108 codec 407d. The content streaming service module 110 may be configured to collect various information from the first user and other sources. The content streaming service module 110 may be configured to provide secure and fast communications between the first user (for example, player, or the users (102)) and the second user (for example, streaming service provider, or the content owners (104)), or provide virtual communications, and artificial intelligent suggestions or advice, between the users (102) and the content owners (104) individually or in groups. The content player module 108 and the content streaming service module 110 may be configured to prevent illegal copying, manipulative tactics, man-in-the-middle attacks, reverse engineering, along with preventing 3rd party devices from illegally recording, streaming, or sharing the contents, virtual communications, and artificial intelligent suggestions or advice, on the first computing device 102 and the second computing device 104. The content player module 108 and the content streaming service module 110 may also be configured to use their codec modules 319, and 407*d*, to further embed, encode, compress, decompress, and decode the proper logic, encryptions, heuristics data, associated meta data, and management data to the contents, virtual communications, and artificial intelligent suggestions or advice. The content player module 108 and the content streaming service module 110 may also be configured to provide accurate tracking and accounting for second user compensation. The content player module 108 and the content streaming service module 110 may also be configured to provide a universal portal for more actionable features. The content player module 108 and the content streaming service module 110 may be configured to provide a simulation framework for artificial intelligent usages. The content player module 108 and the content streaming service module 110 may also be configured to provide more alternatives for customer billing, transaction disbursements, investments, digital currency trades, non-fungible tokens, and analytics. The content player module 108 and the content streaming service module 110 may also be configured to be used in or on a decentralized infrastructure or decentralized network. The content player module 108 and the content streaming service module 110 may also be configured to use the call-home data for data mining, the precise meta data for transparency, when collecting data, and organizing analytics for the content owner 104, and for the fraud detection module 323, fraud manager heuristics 515, and fraud prevention module 325, in order for the content streaming service module 110, and content player module 108, to further take proper actions in real-time, as well as for communicating, updating, sending, transferring, data to one another in real-time.

FIG. 2 depicts a block diagram 200 depicting a schematic representation of the content player module 108 shown in FIG. 1, in accordance with one or more exemplary embodiments. The first computing device 102 includes the content player module 108. The content player module 108 includes an encryption module 203, a symmetric key receiving module 205, an authorization module 207, a cookie module 209, a content generating module 211, a codec module 213, a call-home data transfer module 215. The bus 201 may include a path that permits communication among the modules of the content player module 108. The term "module" is used broadly herein and refers generally to a program resident in memory of the computing device 102 or 104.

The encryption module 203 may be configured to securely authenticate itself (logs in to the second computing device 104) using an established PKI (public key infrastructure), or an established Biometric-PM (biometric public key infrastructure, for encrypting and securing the transaction. PKI is a common infrastructure used in the network 106 for ensuring secure communication between the first computing device 102 and the second computing device 104. Examples are a banking client and bank interactions, an ecommerce client and an ecommerce site transaction or any other business transaction that requires a secure encrypted communication. The encryption module 203 may be concise, proprietary, and encrypted handshakes and protocols for communicating with the content streaming service module 110. The communication and the content streaming service module 110 may not be based on insecure open web technology and, therefore, it is extremely hard and impractical to clone, manipulate, or reverse engineer the app functions by a virtual and artificial machine generated tactic or method, such as by a click-bot or any kind of bot, or a none-virtual and artificial machine, such as a human.

After authentication, the symmetric key receiving module 205 may be configured to receive a symmetric key (through PKI, or a Biometric-PKI) on the first computing device 102 from the second computing device 104 for future communication between the two entities. Symmetric keys may be used for secure high-speed communication between the first computing device 102 and the second computing device 104 and are appropriate for use in real time or near real time communications, or for virtual communications, and artificial intelligent suggestions or advice. The reason PKI, or a Biometric-PKI may not be used for this purpose is the inherent latency of the non-symmetric public/private key encryption in PKI, or in a Biometric-PKI. From this point forward, only the symmetric key may be used for first and second computing device 102/104 communications, or for virtual communications, and artificial intelligent suggestions or advice.

After authentication, the content streaming service module 110 from the second computing device 104 may send an authorization message to the first computing device 102. The authorization module 207 may use the authorization message, to manage the offline usages and may include the following:

a. Buffer Size: the amount of contents, virtual communications, and artificial intelligent suggestions or advice—along with their embedded codec logic, encryptions, heuristics data, associated meta data, and management data—that can exist on the first computing device 102 in a play or usage buffer at the same time. Buffering may be used by the first user to buffer a number of contents, virtual communications, and artificial intelligent suggestions or advice—along with their embedded codec logic, encryptions, heuristics data, associated meta data, and management data—for offline use (e.g., for in-flight use, or on airplane mode, etc.). Buffer size limits the number of streams and its associated data that may be buffered.

b. Time-To-Live: buffered contents, virtual communications, and artificial intelligent suggestions or advice—along with their embedded codec logic, encryptions, heuristics data, associated meta data, and management data—time-to-live on the first computing device 102. This is to ensure that the streamed contents, virtual communications, and artificial intelligent suggestions or advice—along with their embedded codec logic, encryptions, heuristics data, associated meta data, and management data—may not stay forever on the first computing device 102 and self-erases after time-to-live is expired.

c. Time-To-Prevent: the fraud detection module 323, fraud prevention module 325, and the fraud manager heuristics 515, that provides the data to detect, flag and prevent fraud, may be saved into the database 407*c*, and codec module 407*d*, to be used at this time to ensure that the streamed contents, virtual communications, and artificial intelligent suggestions or advice—along with their embedded codec logic, heuristics data, associated meta data, and management data—does not become pirated, manipulated, reverse engineered or misused within offline usages.

The cookie module 209 may be configured to save user login credentials using cookies on the first computing device 102 so the first user may not be compelled to manually login into the content player module 108 each time.

The first user requests one or more content, virtual communications with a content owner (104), and artificial intelligent suggestions or advice, through the content generating module 211 on the first computing device 102. The request may be completed through several methods mentioned below:
  a. Start a search, including voice search by any keyword (e.g., a contents, meta data, ID's, etc.), or request for artificial intelligent suggestions or advice, that may identify one or more contents, virtual communications, and analytics.
  b. On a searcher 407a, that may identify one or more contents, users (102) and content owners (104) for virtual communications, or artificial intelligent suggestions or advice, along with their embedded codec logic, encryptions, heuristics data, associated meta data, and management data; that can also use the database 407c, and codec module 407d.
  c. Request a continuous usage or play of contents, virtual communications, and artificial intelligent suggestions or advice, from a pre-established "service" that has the desired software or "station" that has the desired genre (similar to online radio).

Regardless of the technique employed for selecting the content, the content request may also include the following identifiers namely:
  a. User ID/Content Owner ID: the ID, or biometrics of the user (102) and content owner (104) used during login process
  b. The first computing device ID: a unique device identifier, e.g., serial number
  c. Location ID/Device GPS 409a: first computing device location ID is either obtained by the content player module 108 through querying the geo coordinates from on device GPS or, at a minimum, it is the IP address of the device which may be used to narrow down the device location
  d. User Device Applications/Features 409d, e.g.; camera, microphone, hacking applications
  e. The request time (time-stamp)
  f. Analytics The requested contents, virtual communications with a content owner (104), and artificial intelligent suggestions or advice, may be sent using the codec module 319 to embed, and encode them with the proper logic, encryptions, heuristics data, associated meta data, and management data, by the content streaming service module 110 from the second computing device 104 to the content generating module 211 through a payload that includes a stream of contents, virtual communications by the content owner (104), and artificial intelligent suggestions or advice—along with their embedded logic, encryptions, heuristics data, associated meta data, and management data—that then becomes decoded through the content player module 108, codec module 407d. The payload data that is included contains (in an encrypted format):
  a. The Content ID: a unique ID that is used by the content streaming service module 110 to identify the contents, virtual communications, and artificial intelligent suggestions or advice (e.g. track of music, clip of video, an image, type of data, specific code, meta data, analytics, user ID, and content owner ID)
  b. Any other feature or data that is useful for the player to display to the first user, such as, notifications, suggestions, advice, warnings, stoppings, editing tools, sharing tools, virtual communication portal, analytics, name, artist, creator, ranks, value, genre, duration of the stream.
  c. The stream of contents, virtual communications, and artificial intelligent suggestions or advice—along with their embedded codec logic, encryptions, heuristics data, associated meta data, and management data: may have any of the popular formats (e.g. .mp3, .mov, .pdf, xml, html), or new future formats, but it is part of the encrypted stream of contents, virtual communications, and artificial intelligent suggestions or advice that may be embedded, and encoded into the format, or into a new format.

When the content player module 108 starts playing, using, and preventing fraudulent tactics of the stream of contents, virtual communications, and artificial intelligent suggestions or advice, it connects to the content streaming service module 110 (i.e., calls home) with the following information:
  a. Content ID of the played or used stream
  b. Contents, virtual communications, artificial intelligent suggestions or advice, that has been embedded with the proper codec logic, encryptions, heuristics data, its associated meta data, and management data
  c. Device ID
  d. User Device Applications or Features being used
  e. User ID, Content Owner ID, and their Biometrics
  f. Location ID
  g. Usage-Play start time (time-stamp)
  h. Keywords (audio or none-audio)
  i. Users (102) Usage Behaviors and Patterns
  j. User device (102) usages and misusage preventions of the played, used streams of content, virtual communications, artificial intelligent suggestions and advice
  k. Users (102) usage preventions
  l. artificial intelligent suggestions and advice.

The call-home data transfer module 215 may be configured to send call-home data to the content streaming service module 110 using the symmetric encryption key and thus is secure and may not be simulated by any third-party software. The call-home data may include data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time; but is not limited to: demographic data, analytic data, natural language data, targeted marketing, sales, advertising, pre-released content and for collecting further details, updates, and to take proper actions to use in fraud prevention heuristics 325, and 515 purposes.

If the contents, virtual communications, and artificial intelligent suggestions or advice—along with their embedded codec logic, encryptions, heuristics data, associated meta data, and management data—is buffered for offline play or usage, or for fraud preventions, the call-home data transfer module 215 is configured to send call-home data to the content streaming service module 110 (or buffered if the device is offline) when the stream of contents, virtual communications, and artificial intelligent suggestions or advice is actually played, used, or prevents fraud.

If the first computing device 102 is offline when the contents, virtual communications, and artificial intelligent suggestions or advice—along with their embedded codec logic, encryptions, heuristics data, associated meta data, and management data—is used, played, or is preventing fraudulent tactics, the call-home data transfer module 215 is configured to keep Call-Home information in an output buffer until the first computing device 102 is back online and then transmitted to the content streaming service module 110.

The call-home data transfer module 215 may be configured to allow the content streaming service module 110 to use the call-home data for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time. This leads to:

Instant, up-to-the-minute minute and accurate second user or content owner (104) compensation.

Different client billing alternatives, e.g., billing by used or played streams as opposed to monthly fixed billing Provides accurate all-ome data that may better support a freemium model in which the free content streaming service module 110 is supported by marketing content, products, pre-releases, advertising, and watermarks.

Referring to FIG. 3, FIG. 3 is a block diagram 300 depicting a schematic representation of the content streaming service module 110 shown in FIG. 1, in accordance with one or more exemplary embodiments. The content streaming service module 110 includes a public key, or a biometric key establishing module 303, an authentication module 305, a symmetric key generating module 307, a database 309, a request receiving module 311, a call-home data module 313, a content server 315, a codec module 319, an activity database 321, a targeted advertising and marketing module 317, fraud detection module 323 and fraud prevention module 325. The bus 301 may include a path that permits communication among the modules of the content streaming service module 110. The term "module" is used broadly herein and refers generally to a program resident in memory of the computing device 102 or 104.

The content streaming service module 110 is the entity that is responsible for streaming, and using the codec module 319 to embed, encode, the proper logic, encryptions, heuristics data, associated meta data, management data, and preventing fraudulent tactics of the requested contents, virtual communications by the content owner (104), and artificial intelligent suggestions or advice to the first user on the first computing device 102, that decodes them through the content player module 108, codec module 407d. It may be part of the second users' infrastructure or may be a separate entity. When a login request is received from the content player module 108, the public key establishing module 303 establishes a PKI infrastructure, or establishes a Biometric-PKI between the content streaming service module 110 and itself for secure dialogue. Establishing PKI, or establishing a Biometric-PKI normally involves engaging a third party certificate authority-CA. However, in this case, since the content player module 108 is designed specifically to work with the content streaming service module 110, the content streaming service module 110 may already have the public key, or the biometric public key built into it, thus obviating the need for a CA.

Once the PKI, or the Biometric-PKI is established, the authentication module 305 may authenticate the user through a biometric authentication login credentials or a pre-established login credentials within a user credentials table 1 shown in FIG. 5.

After successful authentication, the symmetric key generating module 307 randomly generates a symmetrical encryption key, based on the user ID, content owner ID, biometrics and device ID. The symmetrical encryption key may be used henceforth for communications between the content player module 108 on the first computing device and the content streaming service module 110, and for virtual communications, or artificial intelligent suggestions and advice. Different first users may have different symmetric encryption keys for communication with the content streaming service module 110. Also, if the first user has multiple devices (e.g., a cellphone, a tablet, a PC), each device may establish its own symmetric key for communication with the content streaming service module 110 even though the login credentials remain the same. In addition, for added security, this symmetric key may be regenerated every time the content player module 108 logs in to the service.

The request receiving module 311 may be configured to respond to the first user's requests for searching, including voice search, or request for artificial intelligent suggestions or advice, for various contents, virtual communications with a content owner (104), artificial intelligent suggestions or advice, and analytics, based on the provided keywords. It does that by consulting its catalogues, contents, virtual communications, and artificial intelligent suggestions or advice. Such catalogues, contents, virtual communications, and artificial intelligent suggestions or advice, are optionally automatically or optionally synchronized with the database 309; and automatically or optionally embedded, encoded, compressed, decompressed, decoded, using the codec module 319, with the proper logic, encryptions, heuristics data, its associated meta data, and management data with the database 309. The database 309 may also be a third-party administered database 413. The third-party-administered database may include a third-party organization, or a company database (shown in FIG. 4 and FIG. 5) i.e., it may be an organization such as the mechanical licensing collective (MLC), or a company such as a software solutions provider (e.g., solutions such as applications, features, API's, SDK's, or etc.). The request receiving module 311 eventually receives the user's request for playing, Of using, or being prevented due to a fraudulent tactic of the one or more of selected contents, virtual communications, and artificial intelligent suggestions or advice, with the given content ID, or other identifications. The user's request includes the user's ID, device ID, other identifiers, and the like. Finally, the content server 315 may be configured to send the requested contents, virtual communications, and artificial intelligent suggestions or advice, from a content database (shown in FIG. 5) to the first computing device 102 along with a set of content identifying metadata, and their embedded codec logic, encryptions, heuristics data, associated meta data, and management data, using the codec module 319, that then becomes decoded by the content player module 108, codec module 407d.

When one or more contents, virtual communications, and artificial intelligent suggestions or advice, is actually played, used, by the first user on the first computing device 102, or was prevented from the first user on the first computing device 102, the content server 315 identifies the call-home data such as the device, user, and location of the device among other data. The content server 315 may be configured to keep the data as a row in an activity table shown in FIG. 5.

The activity table may be an integral part of the call-home data module 313 and is used for several purposes namely:
  a. The activity table is used to create an accurate accounts payables record for the second user compensation,
  b. The activity table is used by the fraud prevention heuristics 325, and 515.
  The activity table is used for tracking virtual communications, artificial intelligent suggestions or advice, and contents searches, usages, plays, fraud preventions, while collecting the accurate call-home data.

The activity database 321 may be configured to store activities between the content player module 108 and the content streaming service module 110.

The targeted advertising and marketing module 321 may be configured to use the activity table for tracking virtual communications, artificial intelligent suggestions or advice, and contents, searches, usages, plays, fraud preventions, while collecting the call-home data for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

The fraud detection module 323, fraud prevention module 325, and fraud manager heuristics 515, may be configured to further prevent illegal copying, manipulative tactics, man-in-the-middle attacks, reverse engineering, along with preventing $3^{rd}$ party devices that are present from illegally recording, streaming, or sharing the contents, virtual communications, and artificial intelligent suggestions or advice, to detect the fraudulent tactic in real-time or during offline, based on fraud manager heuristics 515, and then the fraud detection module 323 may take an appropriate action to prevent the fraud in real-time and during offline plays or usages of the contents, virtual communications, artificial intelligent suggestions or advice, using the fraud prevention module 325. Since the precise user usage history is available to the content streaming service module 110, fraud detection module 323 may use the following data to define a heuristic to flag, stop, delete, or prevent a fraudulent tactic in real-time, or during offline plays, and usages, using the fraud manager heuristics 515, and fraud prevention module 325:
Number of times one or more content, virtual communications, and an artificial intelligent suggestions or advice, is used, played, or prevented fraud in a given period of time
If the same contents, virtual communications, artificial intelligent suggestions or advice are used or played repeatedly on the same first users device (102)
State of the player playback (e.g., mute playing, etc.)
User device (102) applications, or features, that are being used with the contents, virtual communications, and artificial intelligent suggestions or advice by a user (102)
If there are any derogatory, or threatening keywords being used, within a virtual communication by a first user (102), or content owner (104)
If there are any manipulative applications downloaded on the user device (102)
If the user device (102) camera detects a present third-party device
If the user device (102) microphone detects, or picks up a present keyword
If the user device (102) plays, or uses the same contents, virtual communications, and artificial intelligent suggestions or advice, from an illegal source
If the user (102), or content owner (104), failed to match the authentication login processes
If the user (102) attempted to duplicate, or did duplicated the contents, virtual communications, and artificial intelligent suggestions or advice, using their device (102)
If the user (102) is using, playing, or has requested one or more contents, virtual communications, artificial intelligent suggestions or advice, that contains audio
User (102) usages, and their behaviors, or patterns
The blacklist state, i.e., is the first user or device 102, or even the content owner (104) already blacklisted for potential fraudulent use.

The fraud prevention module 325, fraud detection module 323, and fraud manager heuristics 515 may be configured to provide one or more fraud-prevention policies. The following may be formulated and executed:
  "If the user (102) plays, or uses, the one or more contents, virtual communications, and artificial intelligent suggestions or advice, from the content owner (104), more than n times in an m hour period, raise a flag, and stop serving the stream to the user device (102) for a p hour period."
  "If the user (102) attempts to duplicate the contents, virtual communications, and artificial intelligent suggestions or advice, raise a flag on the user (102), and self-erase the contents, virtual communications, artificial intelligent suggestions or advice, and the duplicated contents, virtual communications, and artificial intelligent suggestions or advice, on the user device (102)"
  "If the user (102) shares an account to another user, raise a flag on the user (102), and stop that account from being shared"
  "If the user (102) attempts to screen shot, or screen record the contents, virtual communications, and artificial intelligent suggestions or advice, raise a flag on the user (102), and self-erase the contents, virtual communications, artificial intelligent suggestions or advice, and the duplicated contents, virtual communications, and artificial intelligent suggestions or advice, stop the user device (102) from screen shotting, or recording the contents, virtual communications, and artificial intelligent suggestions or advice"
  "If the user (102) attempts to use an object, that looks like a $3^{rd}$ party device that's present, and recording, streaming, or sharing, during or before the usage, or play, of the contents, virtual communications, and artificial intelligent suggestions or advice, automatically access the user device (102) camera, to detect such objects using the computer vision algorithm, once detected, delete, or stop, the contents, virtual communications, and artificial intelligent suggestions or advice, from playing, or from being used, make the user device (102) screen go dark, when the object appears or disappears again, raise a flag on the user (102), and self-erase the contents, virtual communications, and artificial intelligent suggestions or advice on the user device (102)"
  "If the user (102) is using, playing or requesting one or more contents, virtual communications, artificial intelligent suggestions or advice, that contains audio, before delivering, streaming, or allowing the contents, virtual communications, and artificial intelligent suggestions or advice to be received, used, or played, embed the contents, virtual communications, artificial intelligent suggestions or advice, with an ultrasound, or infrasound frequency, that can only be heard or picked up by a recording device, using a codec, to then notify the content owner (104), and send, stream, play, or use the embedded frequency during the usage, or playing of the contents, virtual communications, artificial intelligent suggestions or advice by the user (102), to mitigate, and prevent a $3^{rd}$ party device from properly recording the contents, virtual communications, artificial intelligent suggestions or advice, from the user device (102)"

"If the user (102) attempts any misuse, or manipulative tactics over the contents, virtual communications, and artificial intelligent suggestions or advice, usage rules, and their embedded codec logic, encryptions, heuristics data, associated meta data, and management data, raise a flag on the user (102), and stop, or self-erase the contents, virtual communications, artificial intelligent suggestions or advice, and its duplications from working on the user device (102)"

"If the user (102), or the content owner (104) writes, or says anything derogative, or threatening, in their virtual communications, flag the user (102), or the content owner (104), and warn or suspend both parties (102, 104)"

"If the user (102) attempts to plan a manipulative, or fraudulent action, by saying a present specific keywords that can be a threat during, or before using, or playing the contents, virtual communications, and artificial intelligent suggestions or advice, automatically access the user device (102) microphone to detect, or pick up present specific keywords, by using the speech recognition algorithm, if a specific keyword is detected, or picked up, flag the user (102), and warn, suspend, or prevent the contents, virtual communications, and artificial intelligent suggestions or advice, from being used, or played on the users device (102)"

Referring to FIG. 4, FIG. 4 is an example diagram 400 depicting architecture of the content player module 108 installed on the first computing device 102 shown in FIG. 1, in accordance with one or more exemplary embodiments. The content player module 108 includes a login manager 403, a communication manager 405, a play manager 407, a device poller 409, and a stream player 411.

In a path in FIG. 4, the content player module 108 may be configured to securely authenticate itself (logs in to the second computing device 104) using the established PKI, or an established Biometric-PKI 403a (Public Key Infrastructure, or a Biometric Public Key Infrastructure) for encrypting and securing the transaction. The established PKI, or the established Biometric-PKI 403a may be in the login manager 403. The established PKI, or the established Biometric-PKI 403a is a common infrastructure used in the network 106 for ensuring secure communication between the first computing device 102 and the second computing device 104.

After authentication, the communication manager 405 receives a symmetric key 405a through the PKI, or the Biometric-PKI 403a from the second computing device 104. Symmetric keys 405a may be used for secure high-speed communication between the first computing device 102 and the second computing device 104 and are appropriate for use in real time or near real time communications. The symmetric key may be used for all first user/second user communications, and for virtual communications.

After authentication, the second computing device 104 sends an authorization message to the player manager 407. The authorization message, used primarily to manage the offline usages, includes the followings:

a. Buffer Size: the amount of content—along with their embedded codec logic, encryptions, heuristics data, associated meta data, and management data—that may exist on the first computing device 102 in a usage or play buffer/incoming stream buffer 405b at the same time. Buffering may be used by the first user to buffer 405b a number of streams-along with their embedded codec logic, encryptions, heuristics data, associated meta data, and management data)—or offline use (e.g., for in-flight use, or on airplane mode, etc.). Buffer Size limits the number of streams—along with their embedded codec logic, encryptions, heuristics data, associated meta data, and management data—hat can be buffered.

b. Time-To-Live: buffered contents, virtual communications, and artificial intelligent suggestions or advice—along with their embedded codec logic, encryptions, heuristics data, associated meta data, and management data)—time-to-live on the first computing device 102. This is to ensure that the streamed contents, virtual communications, and artificial intelligent suggestions or advice—along with their embedded codec logic, encryptions, heuristics data, associated meta data, and management data—does not live forever on the first computing device 102 and self-erases after Time-To-Live is expired.

c. Time-To-Prevent: the fraud detection module 323, fraud prevention module 325, and the fraud manager heuristics 515, that provides the data to detect, flag and prevent fraud, may be saved into the database 407c, and codec module 407d, to be used at this time to ensure that the streamed contents, virtual communications, and artificial intelligent suggestions or advice—along with their embedded codec logic, heuristics data, associated meta data, and management data—does not become pirated, manipulated, reverse engineered or misused within offline usages.

In a path in FIG. 4, for convenience, the content player module 108 can use advanced methods, such as biometrics or use standard methods for saving the user login credentials on the first computing device 102 (e.g., using cookies) so the first user is not forced to login manually into the content player module 108 every time.

At this point, both first and second computing devices 102, 104 possess the same symmetric encryption key 405a that may be used for all future communications, as well as for virtual communications, and for artificial intelligent suggestions or advice. The first and second computing devices 102, 104 may be configured to maintain the symmetric key 405a until the next login which will refresh the key. The first user may not try to maintain a session state with the content streaming service module 110. Each request to the content streaming service module 110 is autonomous and includes the information needed by the content streaming service module 110 to stream the contents, virtual communications, and artificial intelligent suggestions or advice, along with embedding, encoding, compressing, decompressing, decoding the proper logic, encryptions, heuristics data, associated meta data, and management data into the contents, virtual communications, and artificial intelligent suggestions or advice. At this point, the first user at this point is authenticated by the content streaming service module 110 as a legitimate user of the service through the standard login process, or an advanced login process, such as a biometric process.

The first user requests the contents, virtual communications with a content owner (104), artificial intelligent suggestions or advice through several techniques:

a. Start a search, including voice search by any keyword (e.g., a content, meta data, ID's, etc.), or request for artificial intelligent suggestions or advice, that may identify one or more contents, content owners, and their analytics.

b. On a searcher 407a, that may identify one or more contents, users (102) and content owners (104) for virtual communications, or artificial intelligent suggestions or advice, along with their embedded codec logic, encryptions, heuristics data, associated meta data, and management data; that can also use the database 407c, and codec module 407d.

c. Request a continuous play or usage of contents, virtual communications, and artificial intelligent suggestions or advice, from a pre-established "service" that has the desired software or "station" that has the desired genre (similar to online radio).

Regardless of the technique used for selecting the content, virtual communications with a content owner (104), artificial intelligent suggestions or advice, the content request also includes the following identifiers:

a. User ID/Content Owner ID: the ID, or biometrics of the user (102) and content owner (102) used during login process, b. Device ID 409b: a unique device identifier, e.g., serial number c. Location ID/Device GPS 409a: the first user device location ID 409a is either obtained by the content player module 108 through querying the geo coordinates from on device GPS 409a or, at a minimum, it is the IP address 409c of the device which may be used to narrow down the device location d. Users Device Applications/Features 409d, e.g.; camera, microphone, hacking applications, etc.

e. The request time (time-stamp)

f. Analytics

The device poller 409, allows the user (102) to give the device GPS 409a, device ID 409b, the device IP address 409c, and allows the fraud detection module 323, fraud prevention module 325, and fraud heuristics manager 515, to access the device Applications/Features 409d, in real-time or during offline—such as using the camera, microphone, or to read a downloaded application; for selecting, playing, using and preventing fraudulent tactics with the contents, virtual communications, and artificial intelligent suggestions or advice, from the play manager 407, database 407c, and codec module 407d; this can also be done through using artificial intelligence, or by the content owner (104) themselves.

In a path in FIG. 4, the requested contents, virtual communications with a content owner (104), artificial intelligent suggestions or advice, may be sent using the codec module 319 to embed, and encode them with the proper logic, encryptions, heuristics data, associated meta data, and management data, by the second computing device 104 to the content player module 108, through a payload that includes the streamed contents, virtual communications by the content owner (104), and artificial intelligent suggestions or advice—along with their embedded logic, encryptions, heuristics data, associated meta data, and management data—that then becomes decoded through the content player module 108, codec module 407d. The data that includes (in the encrypted format):

a. The Content ID: a unique ID that is used by the Streaming Service to identify the stream (e.g. track of music, clip of video, an image, type of data, specific code, meta data, analytics, user ID, content owner ID, etc.) contents, virtual communications, and artificial intelligent suggestions or advice.

b. Any other feature or data that is useful for the player to display to the user, such as, notifications, suggestions, advice, warnings, stoppings, editing tools, sharing tools, virtual communications portal, analytics, name, artist, creator, rank, value, genre and duration of the stream.

c. The streamed contents, virtual communications, and artificial intelligent suggestions or advice—along with their embedded codec logic, encryptions, heuristics data, associated meta data, and management data: may have any of the popular formats (e.g. .mp3, .mov, .pdf, .xml, .html, etc.), or new future formats, but it is part of the encrypted streamed contents, virtual communications, and artificial intelligent suggestions or advice, that may be embedded, and encoded into the format, or into a new format.

In a path in FIG. 4, at this point the player manager 406 has the requested contents, virtual communications, and artificial intelligent suggestions or advice and its associated metadata 407b, along with their embedded logic (e.g.; algorithms, artificial intelligence, a computer vision algorithm, a speech recognition algorithm, etc.), encryptions (e.g., ultrasounds, infrasound's, etc.), heuristics data (e.g. the fraud detection module 323, fraud prevention module 325, and fraud manager heuristics 515 data), and management data (e.g., what the user can do, and can't do, or what the user device can do, and can't do, etc.), by also using the database 407c, and the codec module 407d, to then decode the contents, virtual communications, and artificial intelligent suggestions or advice. Depending on the first user's choice, it may buffered (to be played, used, and prevented from fraud when used later, or offline) or used, played, and prevented from being manipulated, along with their embedded logic, encryptions, heuristics data, associated meta data, and management data from being manipulated.

When the stream player 411 starts using or playing, or preventing fraud, the contents, virtual communications, and artificial intelligent suggestions or advice, connects to the content Streaming Service module 110 (i.e., calls home) with the following information:

a. Content ID of the played or used stream b. Contents, virtual communications, artificial intelligent suggestions or advice, that have been embedded with a codec in logic, encryptions, heuristics data, associated meta data, and management data c. Device ID d. First user (102) Device Applications or Features being used e. User ID, Content Owner ID, and their Biometrics Location ID f. Used-Play start time timestamp g. Keywords (audio or none-audio)

h. Users (102) Usages and their behaviors and patterns i. User device (102) usages and misusage preventions of the played, used streams of content, virtual communications, artificial intelligent suggestions and advice j. Users (102) usage preventions, Artificial intelligent suggestions and advice k. Virtual communications The call-home is a key step in the whole process since at this time, the virtual communications, artificial intelligent suggestions or advice, and the contents are self-aware, and the content streaming service module 110 knows which contents, virtual communications, and artificial intelligent suggestions or advice are, and in action, or being updated. This information may be vital to the content streaming service module 110 for accurate accounting of played, used, and fraud preventions, of a streamed content, virtual communication, and artificial intelligent suggestion or advice that can be used in fraud prevention heuristics 325, and 515 purposes. This data may be sent using the symmetric encryption key 405a, and thus is secure and may not be simulated by a $3^{rd}$ party-administered database 413. The call-home data may also be used for accurate updates, and for real-time fraud detection 323, fraud prevention 325, and fraud manager heuristics 515 purposes; users (102) and content owners (104) virtual communications; artificial intelligent suggestions or advice; and have clear and concise accounting, and real-time tracking of how, when, where, one or more stream contents, virtual communications, and artificial intelligent suggestions or advice is played, used, searched, or was fraud prevented, and by whom, on what device, in which location; user device (102) applications, or features, that are being used with the contents, virtual communications, and artificial intelligent suggestions or advice; if there are any derogatory, or threatening keywords being used, within a virtual communication, by a user (102), or content owner (104); if there are any manipulative applications downloaded on the user device (102); if the user device (102) camera detects a present third-party device; if the user device (102) microphone detects, or picks up a present keyword; if the user device (102) plays, or uses the same content, virtual communication, and artificial intelligent suggestions or advice from an illegal source; if the user (102), or content owner (104), failed to match the authentication login processes; if the user (102) attempted to duplicate, or did duplicated the contents, virtual communications, and artificial intelligent suggestion or advice, using their device (102); user (102) usages, and their behaviours, or patterns; along with data regarding usage edits, transactions, trades, sales, users (102) who went offline, user (102) query searches, user (102) sharing tactics; or uses of the natural language processing; or notifying the content owner (104) after the computer vision and speech recognition algorithms detected and prevented fraud, notifying the content owner (104) if a content, virtual communication, and artificial intelligent suggestion or advice, has been embedded with a ultrasound or infrasound, using a codec; the user (102) or content owner (104) receiving analytics, along with receiving artificial intelligent predictions, prescriptive suggestions, advice, regarding creative and business decision making; or enhance the natural language query searches; along with targeted marketing, pre-releases, advertising, and data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time to prevent fraud, as well as for communicating, updating, sending, transferring, data to one another in real-time.

At a path in FIG. 4, If the contents, virtual communications, and artificial intelligent suggestions or advice—along with their embedded codec logic, encryptions, heuristics data, associated meta data, and management data—is buffered for offline play or usage, or for preventions of fraudulent tactics. The Call-Home data is sent—or buffered if the device is offline- to the content streaming service module 110 when the contents, virtual communications, and artificial intelligent suggestions or advice—along with their embedded codec logic, encryptions, heuristics data, associated meta data, and management data—is actually played or used, or has prevented fraud.

If the device is offline when the contents, virtual communications, and artificial intelligent suggestions or advice—along with their embedded codec logic, encryptions, heuristics data, associated meta data, and management data—is played or used, or has prevented fraud, the Call-Home data is kept in an output buffer 405c until the device 102 is back online and then sent to the content streaming service module 110.

Referring to FIG. 5, FIG. 5 is an example diagram 500 depicting architecture of the content streaming service module 110 installed on the second computing device 104 shown in FIG. 1, in accordance with one or more exemplary embodiments. The content streaming service module 110 includes an authentication manager 503, a communication manager 505, a search manager 507, a catalog database 509, a content database 511, the content server 315, an activity manager 513, a fraud manager heuristics 515, and marketing, advertising block 517, and a second user portal 519.

The content streaming service module 110 is the entity that is responsible for streaming, and using a codec module 319 to embed, and encode, the proper logic, encryptions, heuristics data, associated meta data, management data, and preventing fraudulent tactics of the requested contents, virtual communications, and artificial intelligent suggestions or advice, to the first user on the first computing device 102, that then decodes them through the content player module 108, codec module 407d. When a login request is received from the content player module 108 through the network 106, the content streaming service module 110 establishes the PKI infrastructure, or establishes the Biometric-PKI 503a between the content player module 108 and itself for secure dialogue. Establishing PKI, or establishing Biometric-PM 503a normally involves engaging a third-party Certificate Authority—CA.

Once the PKI, or the Biometric-PKI 503a is established, the content streaming service module 110 may authenticate the user through a biometric authentication login credentials or through a pre-established login credentials within the user credentials table. Other user information along with some of user's authorization parameters are kept in the user credentials table:

TABLE 1

User Credentials Table

| User Name | User ID | User Password | User Authorized Feature Parameters | | |
|---|---|---|---|---|---|
| | | | Buffer Size (Content) | Time-to-Live (sec) | Other . . . |
| Joe Smith | ABC123GH | ********* | 100 | 86,400 | |
| Jane Doe | KLM456PQ | ********* | 50 | 43,200 | |

At a path in FIG. 5, after successful authentication, the content streaming Service module 110 provides two sets (or more) of information to the content player module 108:

a. The content streaming service module 110 randomly generates the symmetrical encryption key 505a, based on the user ID, content owner ID, biometrics, and device ID. This key 505a may be used henceforth for communications between the content player module 108 on the first computing device 102 and the content streaming service module 110, as well as for virtual communications, and artificial intelligent suggestions or advice. This key 505a may be stored in the communication manager 505 (streaming service user-device table) for use with the requesting user. Different users may have different symmetric encryption keys for communications with the content streaming service module 110. Also, if the first user has multiple devices (e.g., a cellphone, a tablet, a PC), each device may establish its own symmetric key 505a for communication with the content streaming service module 110 even though the login credentials remain the same. In addition, for added security, this symmetric key 505a is regenerated every time the content player module 108 logs in to the service. See Table 2:

TABLE 2

USER-DEVICE TABLE

| User ID | Device ID | Symm. Key | Device Type | Other . . . |
|---|---|---|---|---|
| ABC123GH | ZZIOS1234 | Asd67$%^ddsf | iPhone 7 | . . . |
| ABC123GH | ZZAND5678 | Bp[qwwe7$#@ | Android Tablet | . . . |
| KLM456PQ | ZXWINPC12 | PnbG09&^%DR | Win10 PC | . . . | b. The content streaming service module 110 passes a set of metadata that defines user's level of authorization, shown in Table 2, User-Device Table.

This data may be communicated back to the content player module 108. The PKI, or the Biometric-PKI 503a is torn down at this point as it is no longer needed. Further communication with the first computing device 102 may be through the established PM, or the established Biometric-PKI 503a. The search manager 507 may be configured to search, including voice search any keyword (e.g., a content, meta data, etc.), or request for artificial intelligent suggestions or advice, to identify one or more contents, virtual communications, artificial intelligent suggestions or advice, and their analytics.

In FIG. 5, the content streaming service module 110 responds to the first user requests for searching various content based on the provided keywords. It does that by consulting its Catalogs/second user catalog manager 509/ 509a. Such catalogs/second user catalog manager 509/509a are optionally synchronized with the 3$^{rd}$ party-administered database 413.

In FIG. 5, the content server 315 eventually receives the user's request from the communication manager 505 for playing or using one or more of the selected content, virtual communications, and artificial intelligent suggestions or advice, with the given content ID. The user's request includes the user's ID, or their biometrics, device ID, other identifiers, and the like. Finally, the content server 315 may be configured to send the requested contents, virtual communications, and artificial intelligent suggestions or advice from the content database 511 to the first computing device 102 along with a set of content identifying metadata, and their embedded logic, encryptions, heuristics data, associated meta data, and management data, using the codec module 319, that then becomes decoded by the content player module 108, codec module 407d.

In FIG. 5, when the contents, virtual communications, and artificial intelligent suggestions or advice are actually prevented from fraudulent tactics, or used or played by the first user on the first computing device 102, the content server 315 identifies the device, user, and location of the device among other data. The content server 315 may be configured to keep the data as a row in an activity table. There may be one row per content played, used, prevented, codec's that are embedded, or what has been updated:

TABLE 2

Activity Table

| User ID | Device ID | Content ID | Location ID | Play Timestamp | Other . . . |
|---|---|---|---|---|---|
| ABC123GH | ZZIOS1234 | BILLYJEAN6 | 10.168.1.1 | 2018-10-12 10:23:34 | . . . |
| ABC123GH | ZZIOS1234 | CANTOUCH5 | 192.168.1.5 | 2018-10-12 12:28:23 | . . . |
| ABC123GH | ZZAND5678 | CANTOUCH5 | 192.168.1.5 | 2018-11-13 12:28:19 | . . . |
| KLM456PQ | ZXWINPC12 | COMFNUM8 | 15.15.15.15 | 2018-12-12 11:28:25 | . . . |

In FIG. 5, the activity table may be an integral part of the activity manager 513 and is used for several purposes:
 a. The activity table is used to create an accurate accounts payables record for the second user compensation.
 b. The activity table is used by the fraud prevention heuristics 325, and 515.
 The activity table is used for tracking contents, virtual communications, artificial intelligent suggestions or advice, codecs, usages, plays, searches, and collecting the accurate call-home data.
 The activity table may be used periodically for several purposes:
 a. In FIG. 5, Fraud manager heuristics 515, and fraud flag blacklist 515a may be selected for fraud prevention 325 heuristics details.
 b. In FIG. 5, the second user Compensation: The table includes used content records, so a very accurate account of the second user's compensation may be calculated and sent to the accounts payable, Wallets 519*b*, or reported to an index, or a 3rd party index from a second user activity manager 519*a*.

c. In FIG. 5, targeted Advertising and Marketing 517: the call-home data in the table may be used for virtual communications, artificial intelligent suggestions or advice, sales, targeted marketing, products, pre-released content, advertising, and for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

In FIG. 5, the activity table along with the Catalogs database 509 may provide a second user portal 519 for the second user. the second user portal 519 may have content such as:

a. Number of times their content, virtual communications, artificial intelligent suggestions or advice, was used, played or prevented fraud
b. Real-time and offline demographics on where, and when, how, and by whom their content was used, played or prevented fraud
c. Estimated compensation. This estimate may be finalized at the end of the payment period through compensation calculator as discussed previously
d. Type of devices used in using their content
e. User devices (102) applications or features being used and are present
f. Which content was embedded with the proper codec logic, encryptions, heuristics data, associated meta data, and management data
g. Which content was using its codec logic, encryptions, heuristics data, associated meta data, and management data
h. Fraud preventions
i. User usages, and their behaviors and patterns
j. Virtual communications
k. Artificial intelligent suggestions or advice
l. Analytics, or predictive, prescriptive analytics
m. Updates Referring to FIG. 6, FIG. 6 is an example flow diagram 600 depicting a method for saving the first user login credentials, in accordance with one or more exemplary embodiments. The method 700 may be carried out in the context of the details of FIG. 1, FIG. 2, FIG. 3, FIG. 4, and FIG. 5. However, the method 600 may also be carried out in any desired environment. Further, the aforementioned definitions may equally apply to the description below.

The method commences at step 602, enabling the first user to request the stream of contents, virtually communicate with the second user (104), or request artificial intelligent suggestions or advice, on the content player module installed on the first computing device. Thereafter at step 604, authenticating the content player module on the first computing device using the established PKI (public key infrastructure), or the established Biometric-PM (biometric public key infrastructure), for encrypting and securing the transaction between the first computing device and the second computing device. Thereafter at step 606, sending the symmetric encryption key from the second computing device to the first computing device through the established PKI, or the established Biometric-PKI. Thereafter at step 608, establishing in real-time a secure high-speed communication, as well as for virtual communications, and artificial intelligent suggestions or advice, between the first computing device and the second computing device with the symmetric encryption key occurs. Thereafter at step 610, sending an authorization message to the first computing device from the second computing device to manage the offline usages. Thereafter at step 612, saving the first user login credentials on the first computing device for eliminating the requirement of the first user to login manually into the content player module each time.

Referring to FIG. 7, FIG. 7 is an example flow diagram 700 depicting a method for streaming, using a codec module to embed, encode, compress, decompress, and decode the proper logic, encryptions, heuristics data, associated meta data, management data, and preventing fraudulent tactics, of the requested contents, virtual communications, and artificial intelligent suggestions or advice, by the content player module, in accordance with one or more exemplary embodiments.

The method 700 may be carried out in the context of the details of FIG. 1, FIG. 2, FIG. 3, FIG. 4, FIG. 5, and FIG. 6. However, the method 700 may also be carried out in any desired environment. Further, the aforementioned definitions may equally apply to the description below.

The method commences at step 702, selecting the search technique, or request for artificial intelligent suggestions or advice, by the first user using the content player module on the first computing device. Thereafter at step 704, requesting one or more contents, or to virtually communicate with a content owner (104), and request artificial intelligent suggestions or advice, by the first user using the content player module on the first computing device. Thereafter at step 706, sending the contents, virtual communications by the user (102), and artificial intelligent suggestions or advice, requests from the content player module on the first computing device to the second computing device through a network. Thereafter at step 708, receiving the contents, virtual communications by the user (102), and artificial intelligent suggestions or advice, requests on the content streaming service module on the second computing device from the first computing device and retrieving the requested contents, virtual communications by the content owner (104), and artificial intelligent suggestions or advice, by the content streaming service module on the second computing device. Thereafter at step 710, delivering the requested contents, virtual communications by the content owner (104), and artificial intelligent suggestions or advice, using the codec module 319 to embed, and encode them with the proper logic, encryptions, heuristics data, associated meta data, and management data to the first computing device from the second computing device by the content streaming service module. Thereafter at step 712, streaming, using the codec module 407*d* to decode, the proper logic, encryptions, heuristics data, associated meta data, management data, and preventing fraudulent tactics, of the requested contents, virtual communications by the second user (104), and artificial intelligent suggestions or advice, by the content player module on the first computing device.

Referring to FIG. 8, FIG. 8 is an example flow diagram 800 depicting a method for securing and eliminating the usage of the content player module by third party modules, in accordance with one or more exemplary embodiments. The method 800 may be carried out in the context of the details of FIG. 1, FIG. 2, FIG. 3, FIG. 4, FIG. 5, FIG. 6 and FIG. 7. However, the method 800 may also be carried out in any desired environment. Further, the aforementioned definitions may equally apply to the description below.

The method commences at step 802, requesting the contents, virtual communications with a content owner (104), and artificial intelligent suggestions or advice, by the first user using the content player module on the first computing device. Thereafter at step 804, delivering the contents, virtual communications by the content owner (104), and artificial intelligent suggestions or advice, using the codec module 319 to embed, and encode them with the proper logic, encryptions, heuristics data, associated meta data, and management data, to the first computing device from the second computing device by the content streaming service module through a payload that includes a stream of contents, virtual communications, and artificial intelligent suggestions or advice—along with their embedded logic, encryptions, heuristics data, associated meta data, and management data—that then becomes decoded through the content player module 108, codec module 407d.

Thereafter at step 806, determine whether the first user plays, uses, or was prevented from using, playing the contents, virtual communications, and artificial intelligent suggestions or advice, online on the first computing device through the content player module. If the answer to step 806 is NO, then the exemplary method continues at step 808, buffering the contents, virtual communications, and artificial intelligent suggestions or advice—along with their embedded codec logic, encryptions, heuristics data, associated meta data, and management data—to be played, used, or prevent fraud, when used offline on the content player module. Thereafter at step 810, retaining call-home data in an output buffer until the first computing device is back online thereby sending the call-home data to the content streaming service module. If the answer to step 806 is YES, then the exemplary method continues at step 812, playing, preventing fraudulent tactics, or using the contents, virtual communications, and artificial intelligent suggestions or advice, from by the content player module on the first computing device. Thereafter at step 814, connecting the content player module to the content streaming service module with call-home data. Thereafter at step 816, identifying the call-home data and the contents, virtual communications, and artificial intelligent suggestions or advice, being used, played, or preventing fraudulent tactics on the first computing device by the content streaming service module. Thereafter at step 818, sending the call-home data to the content streaming service module using the symmetric encryption key. Thereafter at step 820, securing and eliminating the usage of the content player module by third party modules. Thereafter at step 822, using the call-home data by the content streaming service module for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

Referring to FIG. 9, FIG. 9 is an example flow diagram 900 depicting a method for providing the accurate call-home data to the second computing device from the content player module, in accordance with one or more exemplary embodiments. The method 900 may be carried out in the context of the details of FIG. 1, FIG. 2, FIG. 3, FIG. 4, FIG. 5, FIG. 6, FIG. 7, and FIG. 8. However, the method 900 may also be carried out in any desired environment. Further, the aforementioned definitions may equally apply to the description below.

The method commences at step 902, authenticating the content player module on the first computing device using the established PKI (public key infrastructure), or the established Biometric-PKI (biometric public key infrastructure). Thereafter at step 904, exchanging the symmetric encryption key between the first computing device and the second computing device. Thereafter at step 906, establishing the fast and secure communications between the first computing device and the second computing device, as well as for virtual communications, and artificial intelligent suggestions or advice. Thereafter at step 908, enabling the content streaming service module on the second computing device to perform clear and concise accounting of the call-home data. Thereafter at step 910, providing the accurate call-home data to the second computing device from the content player module.

Referring to FIG. 10, FIG. 10 is a block diagram illustrating the details of digital processing system 1000 in which various aspects of the present disclosure are operative by execution of appropriate software instructions. Digital processing system 1000 may correspond to the first computing device 102 and the second computing device 104 (or any other system in which the various features disclosed above can be implemented).

Digital processing system 1000 may contain one or more processors such as a central processing unit (CPU) 1010, random access memory (RAM) 1020, secondary memory 1030, graphics controller 1060, display unit 1070, network interface 1080, an input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions, such as those used in threads and stacks, constituting shared environment 1025 and/or user programs 1026. Shared environment 1025 includes operating systems, device drivers, virtual machines, etc., which provide a (common) run time environment for execution of user programs 1026.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse) and may be used to provide inputs. Network interface 1080 provides connectivity to a network (e.g., using Internet Protocol), and may be used to communicate with other systems (such as those shown in FIG. 1, network 106) connected to the network.

Secondary memory 1030 may contain hard drive 1035, flash memory 1036, and removable storage drive 1037. Secondary memory 1030 may store the data software instructions (e.g., for performing the actions noted above with respect to the Figures), which enable digital processing system 1000 to provide several features in accordance with the present disclosure.

Some or all of the data and instructions may be provided on the removable storage unit 1040, and the data and instructions may be read and provided by removable storage drive 1037 to CPU 1010. Floppy drive, magnetic tape drive, CD-ROM drive, DVD Drive, Flash memory, a removable memory chip (PCMCIA Card, EEPROM) are examples of such removable storage drive 1037.

The removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to the removable storage unit 1040 or hard disk installed in hard drive 1035. These computer program products are means for providing software to digital processing system 1000. CPU 1010 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1030. Volatile media includes dynamic memory, such as RAM 1020. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

In an embodiment of the present disclosure, the system configured for controlled streaming of content, virtual communications, and artificial intelligent suggestions or advice, comprising: a content player module 108 configured to enable a first user to request one or more contents, virtual communications with a content owner (104), and request artificial intelligent suggestions or advice, on a first computing device 102 through at least one of: search, including voice search one or more keywords, or request for artificial intelligent suggestions or advice, on the content player module 108; request continuous play or usage of the contents, virtual communications, and artificial intelligent suggestions or advice, from a pre-established station or service on the content player module 108.

In another embodiment of the present disclosure, the system comprising a content streaming service module 110 configured to establish a PKI (public key infrastructure), or to establish a Biometric-PKI (biometric public key infrastructure), for a secure communication between the content player module 108 on the first computing device 102 and a second computing device 104 when a first user's login request received from the content player module 108 to the content streaming service module 110, the content streaming service module 110 configured to send one or more symmetric encryption keys to the content player module 108 on the first computing device 110 through the PM, or the Biometric-PKI, for the secure communication between the first user and a second user, as well as for virtual communications, and artificial intelligent suggestions or advice, the content streaming service module 110 configured to deliver the requested one or more contents, virtual communications by the content owner (104), using the codec module 319 to embed, and encode them with the proper logic, encryptions, heuristics data, associated meta data, and management data, to the content player module 108 through a payload data that includes stream of contents, virtual communications, and artificial intelligent suggestions or advice—along with their embedded logic, encryptions, heuristics data, associated meta data, and management data—that then becomes decoded through the content player module 108, codec module 407d, when the content player module 108 starts using, playing, or preventing fraudulent tactics of the one or more contents, virtual communications, and artificial intelligent suggestions or advice, the content player module 108 configured to connect to the content streaming service module 110 with a call-home data, for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

In another embodiment of the present disclosure, the content streaming service module 110 is configured to send an authorization message to the first computing device to manage offline usages through a network 106. The one or more symmetric encryption keys are configured to establish an encrypted communication between the first computing device 102 and the second computing device 104, as well as for virtual communications, and artificial intelligent suggestions or advice. The content player module 108 is configured to enable the content streaming service module 110 through the call-home data. The content streaming service module 110 is configured to detect a fraudulent use, using the fraud detection module 323, based on fraud manager heuristics 515, and then take an appropriate action to prevent the fraud in real-time or during offline usages or plays, using the fraud prevention module 325. The content streaming service module 110 is configured to use a content meta data, virtual communication meta data, and artificial intelligent suggestion or advice meta data, to define a heuristic to flag, and prevent a fraudulent tactic in real-time, or during offline. The content meta data, virtual communication meta data, and artificial intelligent suggestion or advice meta data, comprising at least one of: number of times contents, virtual communications, and artificial intelligent suggestions or advice, are used, played, or prevented fraud in a given period of time; if the same one or more contents, virtual communications, and artificial intelligent suggestions or advice, are played or used repeatedly on the first computing device (user 102); state of a player playback; users device (102) applications, or features, that are being used with the contents, virtual communications, and artificial intelligent suggestions or advice; if there are any derogatory, or threatening keywords being used within a virtual communication, by a user (102), or content owners (104); if there are any manipulative applications downloaded on the user device (102); if the user device (102) camera detects a present third-party device; if the user device (102) microphone detects, or picks up a present keyword; if the user device (102) plays, or uses the same contents, virtual communications, and artificial intelligent suggestions or advice, from an illegal source; if the user (102), or content owner (104), failed to match the authentication login processes; if the user (102) attempted to duplicate, or did duplicated the contents, virtual communications, and artificial intelligent suggestions or advice, using their device (102); if the user (102) is using, playing, or has requested one or more contents, virtual communications, or artificial intelligent suggestions and advice, that contains audio; user (102) usages, and their behaviors, or patterns; and a blacklist state. The content streaming service module 110 is configured to provide one or more fraud-prevention policies comprising at least one: if the user (102) plays, or uses, the one or more contents, virtual communications, and artificial intelligent suggestions or advice, from the content owner (104), more than n times in an m hour period, raise a flag, and stop serving the stream to the user device (102) for a p hour period; if the user (102) attempts to duplicate the contents, virtual communications, and artificial intelligent suggestions or advice, raise a flag on the user (102), and self-erase the contents, virtual communications, artificial intelligent suggestions or advice, and the duplicated contents, virtual communications, and artificial intelligent suggestions or advice, on the user device (102); if the user (102) attempts to screen shot, or screen record the contents, virtual communications, and artificial intelligent suggestions or advice, raise a flag on the user (102), and self-erase the contents, virtual communications, artificial intelligent suggestions or advice, and the duplicated contents, virtual communications, and artificial intelligent suggestions or advice, stop the user device (102) from screen shotting, or recording the contents, virtual communications, and artificial intelligent suggestions or advice; if the user (102) attempts to use an object, that looks like a $3^{rd}$ party device that's present, and recording, streaming, or sharing, during or before the usage, or play, of the contents, virtual communications, and artificial intelligent suggestions or advice, automatically access the user device (102) camera, to detect such objects using the computer vision algorithm, once detected, delete, or stop, the contents, virtual communications, and artificial intelligent suggestions or advice, from playing, or from being used, make the user device (102) screen go dark, when the object appears or disappears again, raise a flag on the user (102), and self-erase the contents, virtual communications, and artificial intelligent suggestions or advice on the user device (102); if the user (102) is using, playing or requesting one or more contents, virtual communications, artificial intelligent suggestions or advice, that contains audio, before delivering, streaming, or allowing the contents, virtual communications, and artificial intelligent suggestions or advice to be received, used, or played, embed the contents, virtual communications, artificial intelligent suggestions or advice, with an ultrasound, or infrasound frequency, that can only be heard or picked up by a recording device, using a codec, to then notify the content owner (104), and send, stream, play, or use the embedded frequency during the usage, or playing of the contents, virtual communications, artificial intelligent suggestions or advice by the user (102), to mitigate, and prevent a $3^{rd}$ party device from properly recording the contents, virtual communications, artificial intelligent suggestions or advice, from the user device (102); if the user (102) attempts any misusage, or manipulative tactics over the contents, virtual communications, and artificial intelligent suggestions or advice, usage rules, and their embedded codec logic, encryptions, heuristics data, associated meta data, and management data, raise a flag on the user (102), and stop, or self-erase the contents, virtual communications, artificial intelligent suggestions or advice, and its duplications from working on the user device (102); if the user (102), or the content owner (104) writes, or says anything derogative, or threatening, in their virtual communications, flag the user (102), or the content owner (104), and warn or suspend both parties (102, 104); if the user (102) attempts to plan a manipulative, or fraudulent action, by saying a present specific keywords that can be a threat during, or before using, or playing the contents, virtual communications, and artificial intelligent suggestions or advice, automatically access the user device (102) microphone to detect, or pick up present specific keywords, by using the speech recognition algorithm, if a specific keyword is detected, or picked up, flag the user (102), and warn, suspend, or prevent the contents, virtual communications, and artificial intelligent suggestions or advice, from being used, or played on the users device (102);

In another embodiment of the present disclosure, a method for controlled streaming of contents, virtual communications, and artificial intelligent suggestions or advice comprising: enabling a first user to request one or more contents, virtual communications with a content owner (104), and request artificial intelligent suggestions or advice, on a content player module through at least one of: search, including voice search one or more keywords, or request for artificial intelligent suggestions or advice, on the content player module; request continuous play or usage of the one or more contents, virtual communications, and artificial intelligent suggestions or advice, from a pre-established station or service on the content player module; authenticating the content player module on a first computing device by a content streaming service module using an established PKI (public key infrastructure), or an established Biometric-PM (biometric public key infrastructure), for encrypting and securing a transaction between the first computing device and a second computing device, the content streaming service module configured to establish the PKI, or to establish the Biometric-PM, when a first user's login request received from the content player module; sending one or more symmetric encryption keys from the content streaming service module on the second computing device to the first computing device through the established PKI, or the established Biometric-PKI, for a secure communication between the first user and a second user, as well as for virtual communications, and artificial intelligent suggestions or advice; and delivering the requested one or more contents, virtual communications by the content owner (104), and artificial intelligent suggestions or advice, using the codec module 319 to embed, and encode them with the proper logic, encryptions, heuristics data, associated meta data, and management data, to the content player module from the content streaming service module through a payload data that includes stream of contents, virtual communications, and artificial intelligent suggestions or advice—along with their embedded logic, encryptions, heuristics data, associated meta data, and management data—that then becomes decoded through the content player module 108, codec module 407*d*, when the content player module starts playing, using, or preventing fraudulent tactics of the one or more contents, virtual communications, artificial intelligent suggestions or advice from fraud, the content player module configured to connect to the content streaming service module with a call-home data, for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time.

In another embodiment of the present disclosure, a computer program product comprising a non-transitory computer-readable medium having a computer-readable program code embodied therein to be executed by one or more processors, the program code including instructions to: enable a first user to request one or more contents, virtual communications with a content owner (104), and request artificial intelligent suggestions or advice, on a content player module 108 through at least one of: search, including voice search one or more keywords, or request for artificial intelligent suggestions or advice, on the content player module 108; request continuous play or usage of the one more content, virtual communications, and artificial intelligent suggestions or advice, from a pre-established station or service on the content player module 108; authenticate the content player module 108 on a first computing device 102 by a content streaming service module 110 using an established PM (public key infrastructure), or an established Biometric-PKI (biometric public key infrastructure), for encrypting and securing a transaction between the first computing device 102 and a second computing device 104, the content streaming service module 110 configured to establish the PKI, or to establish the Biometric-PKI, when a first user's login request received from the content player module 108; send one or more symmetric encryption keys from the content streaming service module 110 on the second computing device 104 to the first computing device 102 through the established PM, or the established Biometric-PM, for a secure communication between the first user and a second user, as well as for virtual communications, and artificial intelligent suggestions or advice; and deliver the requested one or more contents, virtual communications by a content owner (104), and request artificial intelligent suggestions or advice, using the codec module 319 to embed, and encode them with the proper logic, encryptions, heuristics data, associated meta data, and management data, to the content player module 108 from the content streaming service module 110 through a payload data that includes stream of contents, virtual communications, and artificial intelligent suggestions or advice—along with their embedded logic, encryptions, heuristics data, associated meta data, and management data—that then becomes decoded through the content player module 108, codec module 407*d*, when the content player module 108 starts playing, using, or preventing fraudulent tactic from the one or more contents, virtual communications, and artificial intelligent suggestions or advice, the content player module 108 configured to connect to the content streaming service module 110 with a call-home data, for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time, In another embodiment of the present disclosure, the content player module 108 comprising an encryption module 203 configured to securely authenticate itself using the established PKI, or the established Biometric-PKI, for encrypting and securing the transaction. the content player module 108 comprising a call-home data transfer module 215 configured to send the call-home data to the content streaming service module 110 using the one or more symmetric encryption keys. The content streaming service module 110 comprising a symmetric key generating module 307 configured to randomly generate the one or more symmetric encryption keys based on a user ID, content owner ID, biometrics, and a device ID. The content streaming service module 110 comprising a targeted advertising and marketing module 317 configured to use an activity table for tracking content usages, plays, virtual communications, artificial intelligent suggestions or advice, preventions of fraudulent tactics, and collect the call-home data for data mining, the precise meta data for transparency, when collecting data, and organizing analytics for the content owner 104, and for the fraud detection module 323, fraud manager heuristics 515, and fraud prevention module 325, in order for the content streaming service module 110, and the content player module 108, to further take proper actions in real-time, as well as for communicating, updating, sending, transferring, data to one another in real-time. The content streaming service module 110 comprising a fraud detection module 323, is configured to detect a fraudulent tactic in real-time or during offline, based on fraud manager heuristics 515, and to take an appropriate action to prevent the fraud in real-time or during offline, usages, and plays, using the fraud prevention module 325, use at least one of: number of times contents, virtual communication, and artificial intelligent suggestions or advice, are used, played, or prevented fraud in a given period of time; if the same one or more contents, virtual communications, and artificial intelligent suggestions or advice, are played or used repeatedly on the first computing device (users) 102; state of a player playback; user device (102) applications, or features, that are being used with the contents, virtual communications, and artificial intelligent suggestions or advice; if there are any derogatory, or threatening keywords being used, within a virtual communication by a user (102), or content owner (104); if there are any manipulative applications downloaded on the user device (102); if the user device (102) camera detects a present third-party device; if the user device (102) microphone detects, or picks up a present keyword; if the user device (102) plays, or uses the same contents, virtual communications, artificial intelligent suggestions or advice, from an illegal source; if the user (102), or content owner (104), failed to match the authentication login processes; if the user (102) attempted to duplicate, or did duplicated the contents, virtual communications, and artificial intelligent suggestions or advice, using their device (102); if the user (102) is using, playing, or has requested one or more contents, virtual communications, and artificial intelligent suggestions or advice, that contains audio; user (102) usages, and their behaviors or patterns; and a blacklist state.

In another embodiment of the present disclosure, the content streaming service module 110 comprising a fraud detection module 323 configured to detect a fraudulent tactic in real-time or during offline, based on fraud manager heuristics 515, and to take an appropriate action to prevent the fraud in real-time or during offline, usages, and plays, using the fraud prevention module 325, to provide at least one: if the user (102) plays, or uses, the one or more contents, virtual communications, and artificial intelligent suggestions or advice, from the content owner (104), more than n times in an m hour period, raise a flag, and stop serving the stream to the user device (102) for a p hour period; if the user (102) attempts to duplicate the contents, virtual communications, and artificial intelligent suggestions or advice, raise a flag on the user (102), and self-erase the contents, virtual communications, artificial intelligent suggestions or advice, and the duplicated contents, virtual communications, and artificial intelligent suggestions or advice, on the user device (102); if the user (102) attempts to screen shot, or screen record the contents, virtual communications, and artificial intelligent suggestions or advice, raise a flag on the user (102), and self-erase the contents, virtual communications, artificial intelligent suggestions or advice, and the duplicated contents, virtual communications, and artificial intelligent suggestions or advice, stop the user device (102) from screen shotting, or recording the contents, virtual communications, and artificial intelligent suggestions or advice; if the user (102) attempts to use an object, that looks like a $3^{rd}$ party device that's present, and recording, streaming, or sharing, during or before the usage, or play, of the contents, virtual communications, and artificial intelligent suggestions or advice, automatically access the user device (102) camera, to detect such objects using the computer vision algorithm, once detected, delete, or stop, the contents, virtual communications, and artificial intelligent suggestions or advice, from playing, or from being used, make the user device (102) screen go dark, when the object appears or disappears again, raise a flag on the user (102), and self-erase the contents, virtual communications, and artificial intelligent suggestions or advice on the user device (102); if the user (102) is using, playing or requesting one or more contents, virtual communications, artificial intelligent suggestions or advice, that contains audio, before delivering, streaming, or allowing the contents, virtual communications, and artificial intelligent suggestions or advice to be received, used, or played, embed the contents, virtual communications, artificial intelligent suggestions or advice, with an ultrasound, or infrasound frequency, that can only be heard or picked up by a recording device, using a codec, to then notify the content owner (104), and send, stream, play, or use the embedded frequency during the usage, or playing of the contents, virtual communications, artificial intelligent suggestions or advice by the user (102), to mitigate, and prevent a $3^{rd}$ party device from properly recording the contents, virtual communications, artificial intelligent suggestions or advice, from the user device (102); if the user (102) attempts any misusage, or manipulative tactics over the contents, virtual communications, and artificial intelligent suggestions or advice, usage rules, and their embedded codec logic, or encryptions, heuristics data, associated meta data, and management data, raise a flag on the user (102), and stop, or self-erase the contents, virtual communications, artificial intelligent suggestions or advice, and its duplications from working on the user device (102); if the user (102), or the content owner (104) writes, or says anything derogative, or threatening, in their virtual communications, flag the user (102), or the content owner (104), and warn or suspend both parties (102, 104); if the user (102) attempts to plan a manipulative, or fraudulent action, by saying a present specific keywords that can be a threat during, or before using, or playing the contents, virtual communications, and artificial intelligent suggestions or advice, automatically access the user device (102) microphone to detect, or pick up present specific keywords, by using the speech recognition algorithm, if a specific keyword is detected, or picked up, flag the user (102), and warn, suspend, or prevent the contents, virtual communications, and artificial intelligent suggestions or advice, from being used, or played on the users device (102).

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure further includes and may be defined by the appended claims and includes both combinations and sub-combinations of the various features described hereinabove as well as variations and modifications thereof, which would occur to persons skilled in the art upon reading the foregoing description.

What is claimed is:

1. A method for managing one or more contents, virtual communications between a first user and a content owner, and suggestions provided by artificial intelligence, the method being performed by at least one processor and configured to be performed in real-time and offline, the method comprising:

receiving a request for streaming one or more contents from a first user using a first computing device from a pre-established service or station of a content owner;

receiving login credentials of the first user from the first computing device;

authenticating the first computing device and the first user using an established public key infrastructure (PKI), or an established Biometric-PKI for encrypting and securing a transaction between the first computing device and the content owner, wherein the at least one processor is configured to establish the PKI, or establish the Biometric-PKI when a login request of the first user is received from the first computing device, and are further configured to send one or more symmetric encryption keys to the first computing device through the established PKI, or the established Biometric-PKI for a secure and encrypted virtual communication between the first computing device and the content owner; and delivering the requested one or more contents to the first computing device after retrieving the one or more contents from a database of the content owner to the first computing device through a payload;

wherein before delivering, the one or more contents are encoded by the at least one processor with a logic, encryptions, heuristics data, associated meta data, and management data to generate the payload; and wherein the at least one processor is configured to receive a call-home data from the first computing device, thereby detecting fraud based on the received call-home data, performing one or more preventive actions on the detection of the fraud, and for communicating, updating, sending, transferring, data in real-time.

2. The method of claim 1, wherein, on receiving the requested one or more contents, the first computing device is configured to decode the received one or more contents when the first computing device starts playing or using the one or more contents.

3. The method of claim 1, wherein the call-home data is used for data mining for providing transparency when collecting data, and organizing analytics for the content owner, and for the fraud detection, and fraud prevention by taking the one or more preventive actions in real-time.

4. The method of claim 1, comprising the step of detecting fraudulent tactics in real-time or during offline based on the heuristics data.

5. The method of claim 1, comprising the step of using the associated meta data to define heuristics data to raise flag, and to prevent fraudulent tactics in real-time and during offline, wherein the associated meta data comprises content meta data, virtual communication meta data, and meta data related to the artificial intelligent suggestions.

6. The method of claim 1, further comprising a step of saving the login credentials of the first user on a memory of the first computing device by the first computing device.

7. The method of claim 1, further comprising a step of buffering, when the one or more contents are used offline on the first computing device.

8. The method of claim 1, wherein the first computing device is configured to securely authenticate itself using the established PKI, or the established Biometric-PKI for encrypting and securing the transaction.

9. The method of claim 1, wherein the at least one processor is configured to send an authentication message to the first computing device through a network to manage offline usages.

10. The method of claim 1, wherein the first computing device is configured to send the call-home data to the at least one processor using the one or more symmetric encryption keys.

11. The method of claim 1, wherein the at least one processor is configured to randomly generate the one or more symmetric encryption keys based on a user ID, a content owner ID, biometrics of the first user, and a first computing device ID.

12. The method of claim 1, wherein the heuristics data is defined based on one or more activities of the first user, the one or more activities comprising:
   use of the one or more contents for a number of times in a given period of time;
   state of a player playback;
   features of the first computing device that are being used with the one or more contents;
   use of derogatory, or threatening keywords within the virtual communication by the first user, or the content owner;
   use of manipulative applications downloaded on the first computing device;
   detection of a $3^{rd}$ party device by a camera of the first computing device;
   detection of a keyword by a microphone of the first computing device;
   use of the same contents by the first computing device from an illegal source;
   failure to match the login credentials of the first user;
   attempt to duplicate or duplication of the one or more contents using the first computing device;
   request of the one or more contents that contain audio;
   usage of the first user, and their behaviors or patterns; and
   a blacklist state of the one or more contents.

13. The method of claim 1, wherein the at least one processor is configured to raise a flag and erase the one or more contents or stop streaming the one or more contents on detection of predefined conditions, the predefined conditions comprising:
   use or play of the one or more contents by the first user on the first computing device more than n times in an m hour period;
   attempt of duplication of the one or more content by the first user;
   attempt of taking a screenshot or screen record of the one or more contents by the first user;
   recording, or sharing the one or more contents using a $3^{rd}$ party device before using or playing of the one or more content by the first computing device; and
   attempt of misuse or manipulative tactics over the one or more contents and their embedded codec logic, the encryptions, the heuristics data, the associated meta data, and the management data.

14. The method of claim 1, wherein the at least one processor is configured to notify the content owner on:
   receiving the request of the one or more contents that contain audio and an attempt of embedding one or more such contents using a codec with an ultrasound, or infrasound frequency, that is heard or picked up by a recording device; and
   use of an embedded frequency by the first user to mitigate and prevent a 3rd party device from recording the one or more contents from the first computing device.

15. The method of claim 1, wherein the at least one processor is configured to:
   warn or suspend the first user device and the content owner in case the first user or the content owner writes or says derogative, or threatening, in the virtual communications; and
   warn and suspend the first user device in case the first user attempts to plan a manipulative or fraudulent action by saying a specific keyword during or before using or playing the one or more contents by detecting the specific keyword using microphone of the first user device or by using speech recognition.

16. The method of claim 1, wherein the at least one processor is further configured to track activities of the first user using an activity table while collecting the call-home data.

17. A system for managing contents, virtual communications between a first user and a content owner and suggestions provided by artificial intelligence, said system comprising:
   at least one processor; and
   a memory that is coupled to the at least one processor and that includes computer executable instructions, wherein the at least one processor, based on execution of the computer-executable instructions, is configured to perform the method of claim 1.

18. A computer program product comprising a non-transitory computer-readable medium having a computer-readable program code embodied therein to be executed by at least one processor of a computing device that includes memory, cause the computing device to perform one or more steps of the method of claim 1.

19. The method of claim 2, further comprising a step of streaming of the requested one or more contents after decoding the one or more contents by the first computing device using a codec module with the logic, the encryptions, the heuristics data, the associated meta data, and the management data.

20. The method of claim 7, further comprising a step of retaining, in case the first computing device is offline, the call-home data in an output buffer of the first computing device until the first computing device is back online and sending the call-home data to the at least one processor.

* * * * *